(12) United States Patent
Kounavis et al.

(10) Patent No.: US 11,281,782 B2
(45) Date of Patent: Mar. 22, 2022

(54) MICROPROCESSOR PIPELINE CIRCUITRY TO SUPPORT CRYPTOGRAPHIC COMPUTING

(71) Applicant: Intel Corporation, Santa Clara, CA (US)

(72) Inventors: Michael E. Kounavis, Portland, OR (US); Santosh Ghosh, Hillsboro, OR (US); Sergej Deutsch, Hillsboro, OR (US); Michael LeMay, Hillsboro, OR (US); David M. Durham, Beaverton, OR (US); Stanislav Shwartsman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 143 days.

(21) Appl. No.: 16/724,105

(22) Filed: Dec. 20, 2019

(65) Prior Publication Data
US 2020/0125769 A1 Apr. 23, 2020

Related U.S. Application Data

(60) Provisional application No. 62/868,884, filed on Jun. 29, 2019.

(51) Int. Cl.
*G06F 9/30* (2018.01)
*G06F 12/06* (2006.01)
(Continued)

(52) U.S. Cl.
CPC ........ *G06F 21/602* (2013.01); *G06F 9/30043* (2013.01); *G06F 9/30101* (2013.01);
(Continued)

(58) Field of Classification Search
None
See application file for complete search history.

(56) References Cited

U.S. PATENT DOCUMENTS 8,085,934 B1 12/2011 Bhooma
9,213,653 B2 12/2015 Durham et al.
(Continued)

FOREIGN PATENT DOCUMENTS

EP 2073430 A1 6/2009
EP 3326102 A1 5/2018
(Continued)

OTHER PUBLICATIONS

Savry, Olivier, et al., "Intrinsec, an Intrinsically Secure Processor", RISC V Workshop, Dec. 6, 2019, accessed at: http://riscv.org/wp-content/uploads/2019/06/16.15-CEA-RISC-V-Workshop-Zurich.pdf, 15 pages.
(Continued)

*Primary Examiner* — Michael Pyzocha
(74) *Attorney, Agent, or Firm* — Alliance IP, LLC

(57) ABSTRACT

In one embodiment, a processor of a cryptographic computing system includes data cache units storing encrypted data and circuitry coupled to the data cache units. The circuitry accesses a sequence of cryptographic-based instructions to execute based on the encrypted data, decrypts the encrypted data based on a first pointer value, executes the cryptographic-based instruction using the decrypted data, encrypts a result of the execution of the cryptographic-based instruction based on a second pointer value, and stores the encrypted result in the data cache units. In some embodiments, the circuitry generates, for each cryptographic-based instruction, at least one encryption-based microoperation and at least one non-encryption-based microoperation. The circuitry also schedules the at least one encryption-based microoperation and the at least one non-encryption-based
(Continued)

microoperation for execution based on timings of the encryption-based microoperation.

24 Claims, 17 Drawing Sheets

(51) Int. Cl.

| | | |
|---|---|---|
| G06F 21/79 | (2013.01) | |
| H04L 9/08 | (2006.01) | |
| G06F 9/50 | (2006.01) | |
| H04L 9/14 | (2006.01) | |
| G06F 9/48 | (2006.01) | |
| H04L 9/06 | (2006.01) | |
| G06F 9/455 | (2018.01) | |
| G06F 21/60 | (2013.01) | |
| G06F 12/0897 | (2016.01) | |
| G06F 21/72 | (2013.01) | |
| G06F 12/0875 | (2016.01) | |
| G06F 12/0811 | (2016.01) | |
| G06F 21/12 | (2013.01) | |
| G06F 12/14 | (2006.01) | |
| G06F 9/32 | (2018.01) | |
| G06F 12/02 | (2006.01) | |
| G06F 21/62 | (2013.01) | |

(52) U.S. Cl.
CPC .......... *G06F 9/30178* (2013.01); *G06F 9/321* (2013.01); *G06F 9/45558* (2013.01); *G06F 9/48* (2013.01); *G06F 9/5016* (2013.01); *G06F 12/0207* (2013.01); *G06F 12/0646* (2013.01); *G06F 12/0811* (2013.01); *G06F 12/0875* (2013.01); *G06F 12/0897* (2013.01); *G06F 12/1408* (2013.01); *G06F 12/1458* (2013.01); *G06F 12/1466* (2013.01); *G06F 21/12* (2013.01); *G06F 21/6227* (2013.01); *G06F 21/72* (2013.01); *G06F 21/79* (2013.01); *H04L 9/0637* (2013.01); *H04L 9/0822* (2013.01); *H04L 9/0861* (2013.01); *H04L 9/0869* (2013.01); *H04L 9/0894* (2013.01); *H04L 9/14* (2013.01); *G06F 2009/45587* (2013.01); *G06F 2212/1052* (2013.01); *H04L 2209/125* (2013.01)

(56) References Cited

U.S. PATENT DOCUMENTS

| | | | |
|---|---|---|---|
| 9,436,847 B2 | 9/2016 | Durham et al. | |
| 9,514,285 B2 | 12/2016 | Durham et al. | |
| 9,811,661 B1 | 11/2017 | Golovkin et al. | |
| 9,830,162 B2 | 11/2017 | LeMay | |
| 9,990,249 B2 | 6/2018 | Durham et al. | |
| 10,216,522 B2 | 2/2019 | LeMay | |
| 10,387,305 B2 | 8/2019 | Durham et al. | |
| 10,585,809 B2 | 3/2020 | Durham et al. | |
| 10,706,164 B2 | 7/2020 | LeMay et al. | |
| 2003/0091185 A1 | 5/2003 | Swindlehurst et al. | |
| 2008/0080708 A1 | 4/2008 | McAlister et al. | |
| 2008/0130895 A1 | 6/2008 | Jueneman et al. | |
| 2009/0220071 A1* | 9/2009 | Gueron | G06F 9/30007 380/28 |
| 2009/0254774 A1 | 10/2009 | Chamdani et al. | |
| 2011/0099429 A1 | 4/2011 | Varma et al. | |
| 2011/0161680 A1 | 6/2011 | Grube et al. | |
| 2011/0296202 A1 | 12/2011 | Henry et al. | |
| 2012/0284461 A1 | 11/2012 | Larin et al. | |
| 2013/0275766 A1* | 10/2013 | Plainecassagne | G06F 21/71 713/189 |
| 2015/0244518 A1 | 8/2015 | Koo et al. | |
| 2015/0378941 A1* | 12/2015 | Rozas | G06F 21/00 710/267 |
| 2016/0056954 A1 | 2/2016 | Lee et al. | |
| 2016/0092702 A1 | 3/2016 | Durham et al. | |
| 2016/0094552 A1 | 3/2016 | Durham et al. | |
| 2016/0104009 A1* | 4/2016 | Henry | G06F 9/30178 713/190 |
| 2016/0154963 A1 | 6/2016 | Kumar et al. | |
| 2016/0188889 A1 | 6/2016 | Trivedi et al. | |
| 2016/0285892 A1 | 9/2016 | Kishinevsky et al. | |
| 2016/0364707 A1 | 12/2016 | Varma | |
| 2017/0063532 A1* | 3/2017 | Bhattacharyya | G06F 21/76 |
| 2017/0285976 A1 | 10/2017 | Durham et al. | |
| 2018/0095812 A1* | 4/2018 | Deutsch | H04L 9/0866 |
| 2018/0109508 A1 | 4/2018 | Wall et al. | |
| 2018/0287785 A1 | 10/2018 | Pfannenschmidt et al. | |
| 2018/0365069 A1 | 12/2018 | Nemiroff et al. | |
| 2019/0026236 A1 | 1/2019 | Barnes | |
| 2019/0042481 A1 | 2/2019 | Feghali et al. | |
| 2019/0042734 A1 | 2/2019 | Kounavis et al. | |
| 2019/0042766 A1 | 2/2019 | Pappachan et al. | |
| 2019/0042796 A1 | 2/2019 | Bokern et al. | |
| 2019/0042799 A1 | 2/2019 | Durham et al. | |
| 2019/0044954 A1 | 2/2019 | Kounavis et al. | |
| 2019/0050558 A1 | 2/2019 | LeMay et al. | |
| 2019/0095350 A1 | 3/2019 | Durham et al. | |
| 2019/0102567 A1 | 4/2019 | LeMay et al. | |
| 2019/0102577 A1 | 4/2019 | Gueron et al. | |
| 2019/0227951 A1 | 7/2019 | Durham et al. | |
| 2019/0347445 A1 | 11/2019 | Chen | |
| 2019/0354726 A1 | 11/2019 | Critelli et al. | |
| 2020/0004953 A1 | 1/2020 | LeMay et al. | |
| 2020/0007332 A1 | 1/2020 | Girkar et al. | |
| 2020/0076585 A1 | 3/2020 | Sheppard et al. | |
| 2020/0117810 A1 | 4/2020 | Kounavis et al. | |
| 2020/0125501 A1 | 4/2020 | Durham et al. | |
| 2020/0125502 A1 | 4/2020 | Durham et al. | |
| 2020/0125742 A1 | 4/2020 | Kounavis et al. | |
| 2020/0125770 A1 | 4/2020 | LeMay et al. | |
| 2020/0134234 A1 | 4/2020 | LeMay et al. | |
| 2020/0145187 A1 | 5/2020 | Kounavis et al. | |
| 2020/0145199 A1 | 5/2020 | Kounavis et al. | |
| 2020/0159676 A1 | 5/2020 | Durham et al. | |
| 2020/0169383 A1 | 5/2020 | Durham et al. | |
| 2020/0201789 A1 | 6/2020 | Durham et al. | |
| 2020/0257827 A1 | 8/2020 | Kounavis et al. | |
| 2020/0382289 A1 | 12/2020 | Xue et al. | |
| 2021/0058379 A1 | 2/2021 | Bursell et al. | |

FOREIGN PATENT DOCUMENTS

| | | |
|---|---|---|
| JP | 2009139899 A | 6/2009 |
| WO | 2017014885 A1 | 1/2017 |

OTHER PUBLICATIONS

The Electronics Resurgence Initiative, "SSITH: TA1 (Hardware) Performers", accessed at: https://eri-summit.darpa.mil/docs/ERIPoster_Applications_SSITH_DARPA.pdf, Mar. 20, 2020, 1 page.

"Armv8.5—A Memory Tagging Extension White Paper", Oct. 9, 2019, accessed at https://developer.arm.com/-/media/Arm%20Developer%20Community/PDF/Arm_Memory_Tagging_Extension_Whitepaper.pdf, 9 pages.

Avanzi, Roberto, "The QARMA Block Ciper Family, Almost MDS Matrices Over Rings With Zero Divisors, Nearly Symmetric Even-Mansour Constructions With Non-Involutory Central Rounds, and Search Heuristics for Low-Latency S-Boxes," Qualcomm Product Security, Munich Germany, IACR Transactions on Symmetric Cryptology, 2017 (1) (40 pages).

Beaulieu, Ray et al., "Simon and Spec: Block Ciphers for the Internet of Things," National Security Agency, Jul. 2015 (15 pages).

Borghoff, Julia et al., "PRINCE—A Low-Latency Block Ciper for Pervasive Computing Applications," Advances in Cryptology—AsiaCrypt 2012—18th International Conference on the Theory and Application of Cryptology and Information Security, Beijing, China, Dec. 2-6, 2012. Proceedings (pp. 208-225).

(56) References Cited

OTHER PUBLICATIONS

Carr, Scott A. et al., "DataShield: Configurable Data Confidentiality and Integrity," Purdue University, Asia CCS, '17, Apr. 2-6, 2017, Abu Dhabi, United Arab Emirates (12 pages).
Chen, Tony, et al., "Pointer Tagging for Memory Safety", accessed at https://www.microsoft.com/en-us/research/uploads/prod/2019/07/Pointer-Tagging-for-Memory-Safety.pdf, Jul. 2019, 23 pages.
EPO; Extended European Search Report issued in EP Patent Application No. 20163534.9, dated Sep. 24, 2020; 8 pages.
EPO; Extended European Search Report issued in EP Patent Application No. 20163546.3, dated Sep. 28, 2020; 8 pages.
EPO; Extended European Search Report issued in EP Patent Application No. 20163670.1, dated Sep. 29, 2020; 8 pages.
EPO; Extended European Search Report issued in EP Patent Application No. 20163907.7, dated Oct. 6, 2020; 9 pages.
EPO; Extended European Search Report issued in EP Patent Application No. 20164326.9, dated Oct. 2, 2020; 9 pages.
EPO; Extended European Search Report issued in EP Patent Application No. 20164636.1, dated Oct. 6, 2020; 8 pages.
EPO; Extended European Search Report issued in EP Patent Application No. 20168972.6, dated Jul. 3, 2020; 9 pages.
EPO; Extended European Search Report issued in EP Patent Application No. 20181907.5, dated Nov. 2, 2020; 9 pages.
EPO; Extended European Search Report issued in EP Patent Application No. 20193625.9, dated Feb. 22, 2021; 7 pages.
EPO; Extended European Search Report issued in European Patent Application No. EP 20163095.1, dated Aug. 10, 2020; 9 pages.
EPO; Extended European Search Report issued in Patent Application No. EP 20163518.2, dated Aug. 19, 2020; 10 pages.
EPO; Extended European Search Report issued in Patent Application No. EP 20163661.0, dated Aug. 17, 2020; 9 pages.
Liljestrand, Hans, et al., "PAC it up: Towards Pointer Integrity using ARM Pointer Authentication", accessed at https://arxiv.org/pdf/1811.09189.pdf, last updated May 24, 2019, 21 pages.
Neagu, Madalin, et al.; "Increasing Memory Security Through Data Scrambling and Information Entropy Models," 2014 IEEE 15th International Symposium on Computational Intelligence and Informatics; Nov. 2014; 5 pages.
Watson, Robert N.M., et al., "An Introduction to CHERI", Technical Report UCAM-CL-TR-941, University of Cambridge Computer Labratory, Cambridge, United Kingdom, Sep. 2019, 43 pages.
Xu, Leslie et al., "White Paper, Securing the Enterprise with Intel AES-NI, Intel Advanced Encryption Standard New Instructions (AES—NI)," Intel Corporation, Version, 2.0, Sep. 2010 (13 pages).
Bernstein, Daniel J., "Gimli," Sep. 27, 2019, retrieved from https://csrc.nist.gov/CSRC/media/Projects/lightweight-cryptography/documents/round-2/spec-doc-rnd2/gimli-spec-round2.pdf, (48 pages).
BiiN, "CPU Architecture Reference Manual", accessed at http://bitsavers.informatik.uni-stuttgart.de/pdf/biin/BiiN_CPU_Architecture_Reference_Man_Jul88.pdf, Jul. 1988, 401 pages.
Boivie, Rick, IBM Research Report, SecureBlue++: CPU Support for Secure Execution, May 23, 2012, available online at https://domino.research.ibm.com/library/cyberdig.nsf/papers/E605BDC5439097F085257A13004D25CA/$File/rc25287.pdf, (10 pages).
Dworkin, Morris, "Recommendation for Block Cipher Modes of Operation: The XTS-AES Mode for Confidentiality on Storage Devices," NIST Special Publication 800-38E, Jan. 2010, available online at https://nvlpubs.nist.gov/nistpubs/Legacy/SP/nistspecialpublication800-38e.pdf, (12 pages).
Gallagher, Mark et al., "Morpheus: A Vulnerability-Tolerant Secure Architecture Based on Ensembles of Moving Target Defenses with Churn," ASPLOS '19, Apr. 13-17, 2019, pp. 469-484, available online at https://web.eecs.umich.edu/~barisk/public/morpheus.pdf, (16 pages).
Gallagher, Mark, Slide Deck entitled "Morpheus: A Vulnerability-Tolerant Secure Architecture Based on Ensembles of Moving Target Defenses with Churn," ASPLOS '19, Apr. 13-17, 2019, retrieved from https://twd2.me/wp-content/uploads/2019/05/Morpheus-1.pdf, (45 pages).
Intel 64 and IA-32 Architectures Developer's Manual, vol. 3A: System Programming Guide, Part 1, retrieved from https://www.intel.com/content/www/us/en/architecture-and-technology/64-ia-32-architectures-software-developer-vol-3a-part-1-manual.html, (468 pages).
Intel® 64 and IA-32 Architectures Software Developer's Manual, vol. 2B: Instruction Set Reference, M-U, Sep. 2016, retrieved from https://www.intel.com/content/dam/www/public/us/en/documents/manuals/64-ia-32-architectures-software-developer-vol-2b-manual.pdf, (706 pages).
Intel® 64 and IA-32 Architectures Software Developer's Manual, vol. 3D: System Programming Guide, Part 4, Sep. 2016, 224 pages, retrieved from https://www.intel.com/content/dam/www/public/us/en/documents/manuals/64-ia-32-architectures-software-developer-vol-3d-part-4-manual.pdf, (224 pages).
Liljestrand, Hans et al. "PACStack: an Authenticated Call Stack," Sep. 3, 2019, retrieved from https://arxiv.org/pdf/1905.10242.pdf, (20 pages).
Qualcomm Technologies, Inc., "Pointer Authentication on ARMv8.3, Design and Analysis of the New Software Security Instructions," Jan. 2017, retrieved from https://www.qualcomm.com/media/documents/files/whitepaper-pointer-authentication-on-armv8-3.pdf, (12 pages).
Serebryany, Kostya, "ARM Memory Tagging Extension and How it Improves C/C++ Memory Safety," Summer 2019, (5 pages).
Watson, Robert N.M., et al., "CHERI: A Hybrid Capability-System Architecture for Scalable Software Compartmentalization", 2015 IEEE Symposium on Security and Privacy, May 2015, accessed at https://discovery.ucl.ac.uk/id/eprint/1470067/1/oakland15cheri.pdf, 18 pages.
USPTO Non-Final Office Action in U.S. Appl. No. 16/723,927 dated Jun. 8, 2021 (32 pages).
USPTO Non-Final Office Action in U.S Appl. No. 16/723,977 dated Aug. 3, 2021 (37 pages).
USPTO Non-Final Office Action in U.S. Appl. No. 16/740,359 dated Sep. 27, 2021 (8 pages).
USPTO Notice of Allowance in U.S. Appl. No. 16/723,468 dated Oct. 18, 2021 (11 pages).

* cited by examiner

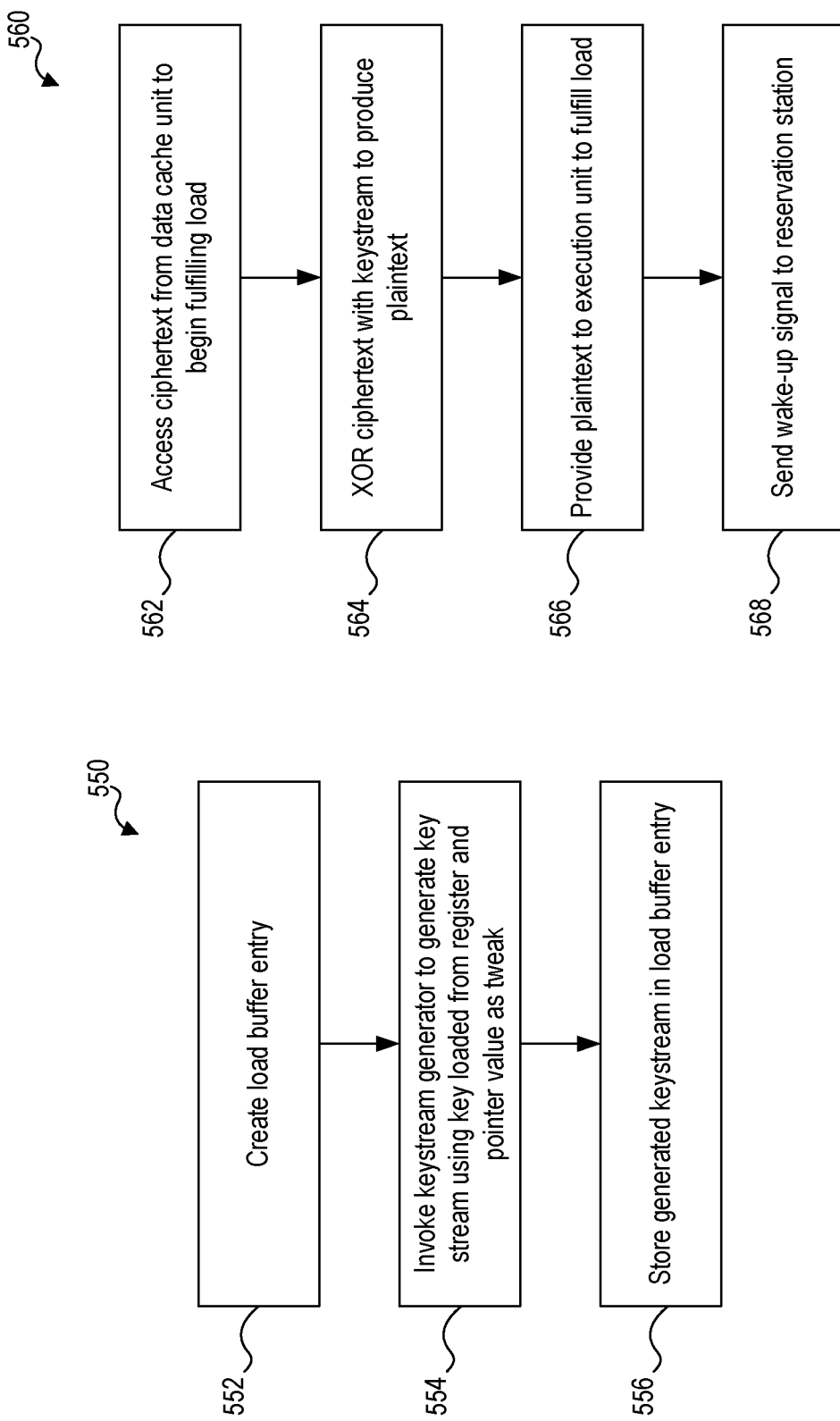

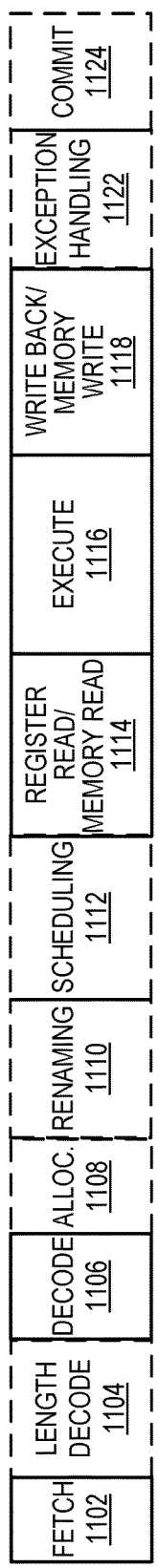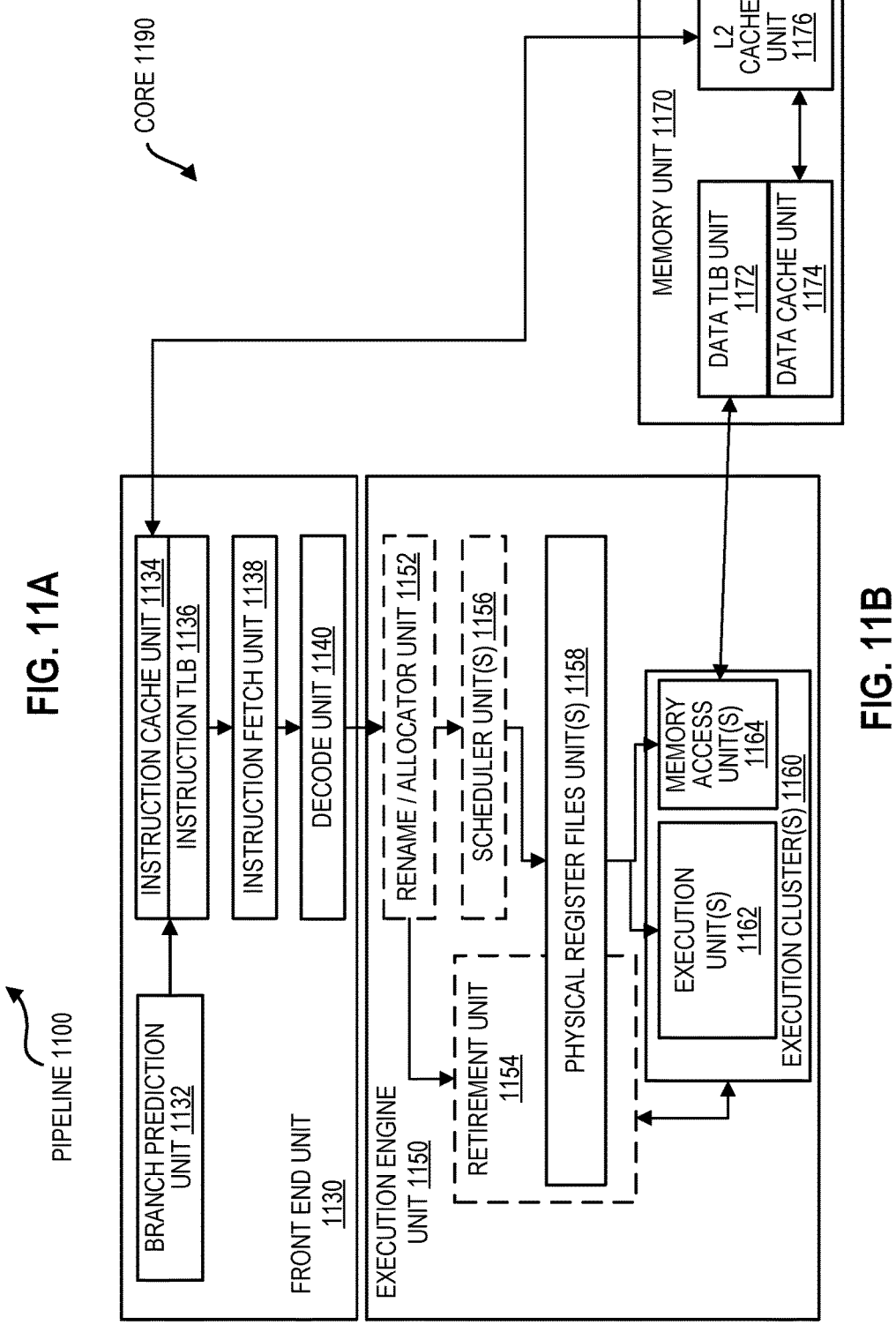

US 11,281,782 B2

MICROPROCESSOR PIPELINE CIRCUITRY TO SUPPORT CRYPTOGRAPHIC COMPUTING

CROSS-REFERENCE TO RELATED APPLICATIONS

This application claims the benefit of and priority from U.S. Provisional Patent Application No. 62/868,884 entitled "Cryptographic Computing" and filed Jun. 29, 2019, the entire disclosure of which is incorporated herein by reference.

TECHNICAL FIELD

This disclosure relates in general to the field of computer systems and, more particularly, to microprocessor pipeline circuitry to supporting cryptographic computing.

BACKGROUND

Cryptographic computing may refer to solutions for computer system security that employ cryptographic mechanisms inside processor components. Some cryptographic computing systems may involve the encryption and decryption of pointers, keys and data in a processor core using new encrypted memory access instructions.

BRIEF DESCRIPTION OF THE DRAWINGS

To provide a more complete understanding of the present disclosure and features and advantages thereof, reference is made to the following description, taken in conjunction with the accompanying figures, where like reference numerals represent like parts, in which:

FIGS. 5A-5C are diagrams of another example data decryption process in a cryptographic computing system.

FIG. 11A is a block diagram of an example in-order pipeline and an example register renaming, out-of-order issue/execution pipeline according to one or more embodiments of this disclosure;

FIG. 11B is a block diagram of an example in-order architecture core and register renaming, out-of-order issue/execution architecture core to be included in a processor according to one or more embodiments of this disclosure.

DETAILED DESCRIPTION

Figure 1:
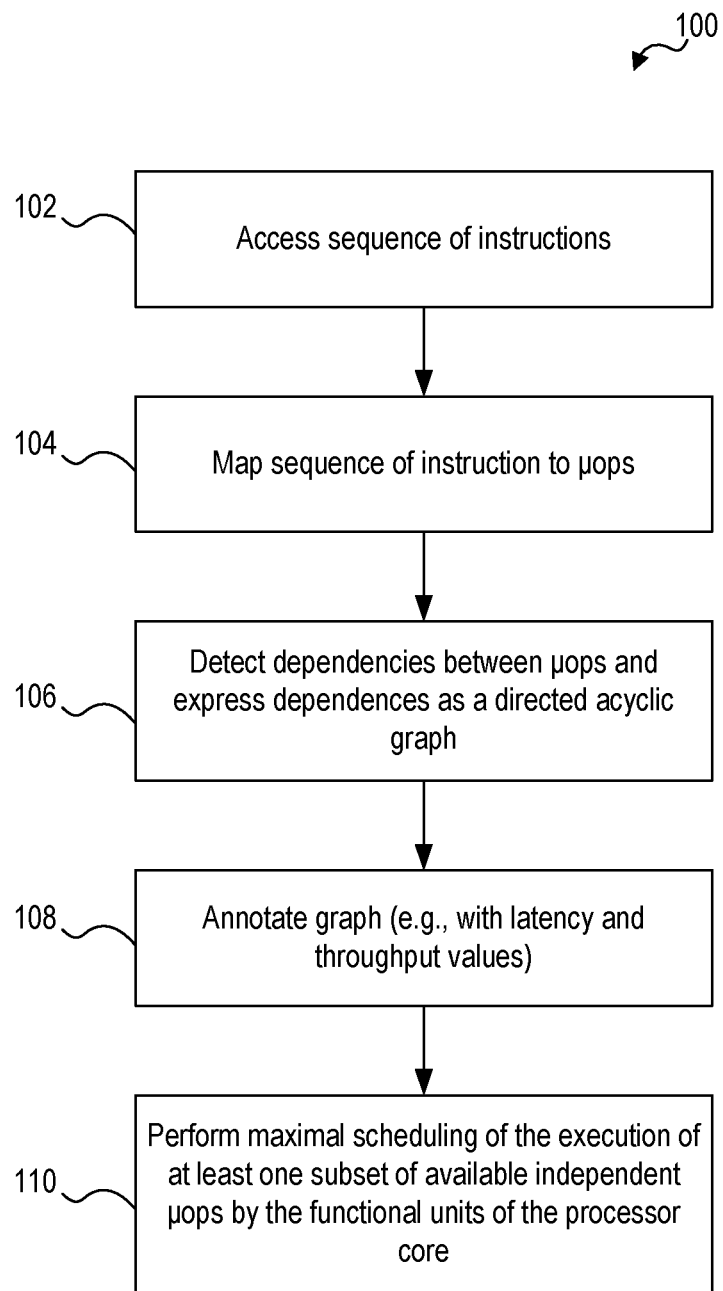
FIG. 1 is a flow diagram of an example process of scheduling microoperations.

The following disclosure provides various possible embodiments, or examples, for implementation of cryptographic computing. Cryptographic computing may refer to computer system security solutions that employ cryptographic mechanisms inside processor components. Some cryptographic computing systems may involve the encryption and decryption of pointers, keys, and data in a processor core using new encrypted memory access instructions. Thus, the microarchitecture pipeline of the processor core may be configured in such a way to support such encryption and decryption operations.

Some current systems may address security concerns by placing a memory encryption unit in the microcontroller. However, such systems may increase latencies due to the placement of cryptographic functionality in the microcontroller. Other systems may provide a pointer authentication solution. However, these solutions cannot support multi-tenancy and may otherwise be limited when compared to the cryptographic computing implementations described herein.

In some embodiments of the present disclosure, an execution pipeline of a processor core first maps cryptographic computing instructions into at least one block encryption-based microoperation (μop) and at least one regular, non-encryption-based load/store μop. Load operations performed by load μops may go to a load buffer (e.g., in a memory subsystem of a processor), while store operations performed by store μops may go to store buffer (e.g., in the same memory subsystem). An in-order or out-of-order execution scheduler is aware of the timings and dependencies associated with the cryptographic computing instructions. In some embodiments, the load and store μops are considered as dependent on the block encryption μops. In embodiments where a counter mode is used, the load and store μops may execute in parallel with the encryption of the counter. In these implementations, a counter common to the plurality of load/store μops may be encrypted only once. In certain embodiments, block encryptions coming from cryptographic computing instructions are scheduled to be executed in parallel with independent μops, which may include μops not coming from cryptographic computing instructions.

Further, in some embodiments, functional units include block encryption or counter encryption operations. For example, data decryption may be performed (e.g., on data loaded from a data cache unit) by a decryption unit coupled to or implemented in a load buffer, and data encryption may be performed (e.g., on data output from an execution unit) by an encryption unit coupled to or implemented in a store buffer. As another example, pointer decryption may be performed by an address generation unit. Any suitable block cipher cryptographic algorithm may be implemented. For example, a small block cipher (e.g., a SIMON, or SPECK cipher at a 32-bit block size, or other variable bit size block cipher) or their tweakable versions may be used. The Advanced Encryption Standard (AES) may be implemented in any number of ways to achieve encryption/decryption of a block of data. For example, an AES xor-encrypt-xor (XEX) based tweaked-codebook mode with ciphertext stealing (AES-XTS) may be suitable. In other embodiments, an AES counter (CTR) mode of operation could be implemented.

In certain embodiments, cryptographic computing may require the linear address for each memory access to be plumbed to the interface with the data cache to enable tweaked encryption and decryption at that interface. For load requests, that may be accomplished by adding a new read port on the load buffer. In embodiments utilizing stream ciphers, e.g., those using the counter mode, the keystream may be pre-computed as soon as the load buffer entry is created. Data may be encrypted as it is stored into the store buffer or may be encrypted after it exits the store buffer on its way to a Level-1 (L1) cache. In some instances, it may be advantageous to start encrypting the data as soon as its address becomes available (e.g., while it may still be in the store buffer) to minimize the total delay for storing the data. If the data is encrypted outside of the store buffer, then a read port may be utilized on the store buffer so that a cryptographic execution unit can read the address.

Aspects of the present disclosure may provide a good cost/performance trade-off when compared to current systems, as data and pointer encryption and decryption latencies can be hidden behind the execution of other μops. Other advantages will be apparent in light of the present disclosure.

FIG. 1 is a flow diagram of an example process 100 of scheduling microoperations. The example process 100 may be implemented by an execution scheduler, such as an out-of-order execution scheduler in certain instances. At 102, a sequence of instructions is accessed by an execution scheduler. The instructions may be inside a window of fixed size (e.g., 25 instructions or 50 instructions). At 104, the sequence of instructions is mapped to a sequence of microoperations (μops). In typical pipelines, each instruction may be mapped to one or more μops in the sequence. At 106, the scheduler detects dependencies between μops and expresses those dependencies in the form of a directed acyclic graph. This may be performed by dependencies logic of the scheduler. As an example, two independent μops, an XOR μop and a load μop, may be represented as nodes in separate parallel branches in the graph. Conversely, dependent μops such as an ADD μop and a following store μop may be represented as sequential nodes in the same branch of the graph. The acyclic graph may include speculative execution branches in certain instances.

At 108, the scheduler may annotate the graph with latency and throughput values associated with the execution of the μops, and at 110, the scheduler performs maximal scheduling of at least one subset of independent μops by the functional units of the processor core. The annotation of 108 may be performed by timing logic of the scheduler and the scheduling of 110 may be performed by scheduling logic of the scheduler. Maximal scheduling may refer to the assignment of independent μops to core functional units that are locally optimal according to some specific objective. For example, the scheduler may perform assignments such that the largest possible number of independent functional units are simultaneously occupied to execute independent μop tasks. In certain embodiments, the scheduling performed at 110 may be repeated several times.

Figure 2:
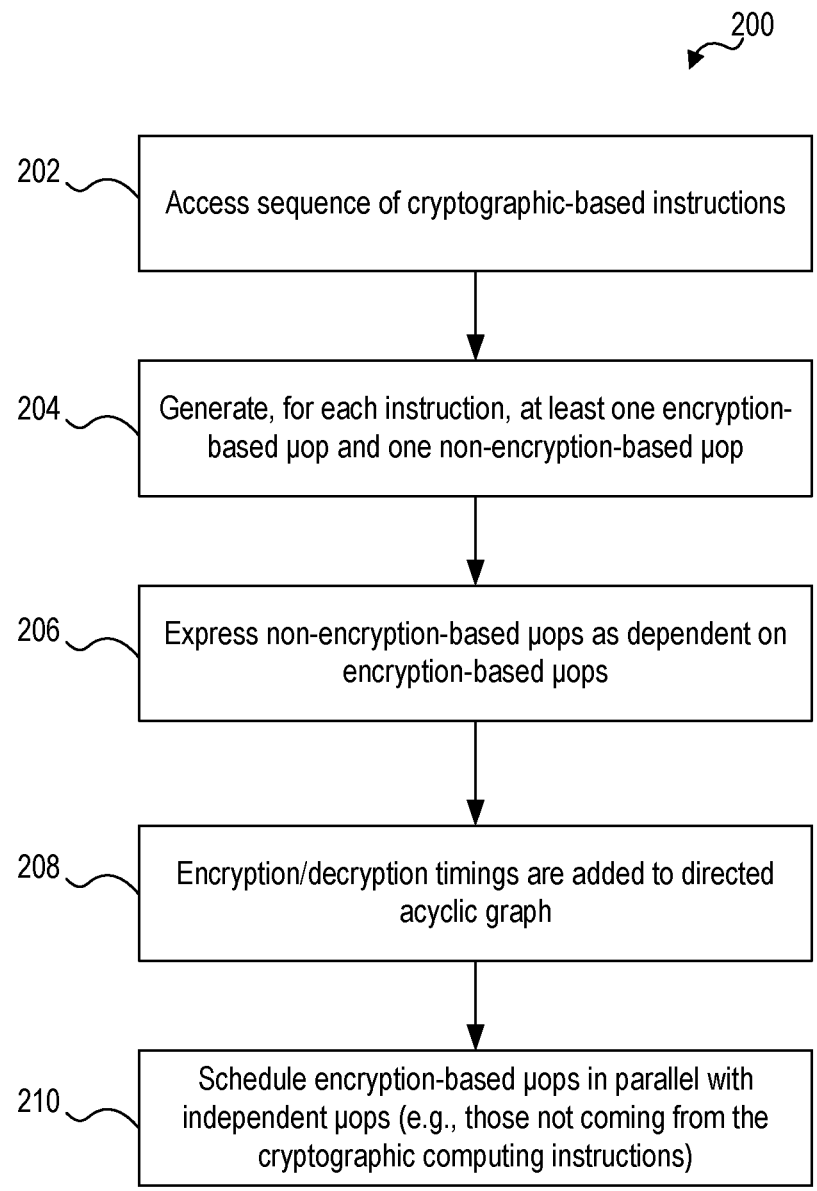
FIG. 2 is a diagram of an example process of scheduling microoperations based on cryptographic-based instructions.

FIG. 2 is a diagram of an example process 200 of scheduling microoperations based on cryptographic-based instructions. The example process 200 may be implemented by an execution scheduler, such as an out-of-order execution scheduler in cryptographic computing systems. At 202, a sequence of cryptographic-based instruction is accessed. This operation may correspond to operation 102 of the process 100. Cryptographic-based instructions may refer to instructions that are to be executed in cryptographic computing systems or environments, where data is stored in memory in encrypted form and decrypted/encrypted within a processor core. An example cryptographic-based instruction includes an encrypted load and store operation. The sequence of instructions may be within a particular window of fixed size as in process 100.

At 204, at least one encryption-based μop and at least one non-encryption based μop are generated for each instruction accessed at 202. This operation may correspond to operation 104 of the process 100. In some embodiments, the encryption-based μop is based on a block encryption scheme. The at least one encryption-based μop may include a data block encryption μop and the at least one non-encryption based μop may include a regular, unencrypted load or store μop. As another example, the at least one encryption-based μop may include a data block decryption μop and the at least one non-encryption based μop may include a regular, unencrypted load or store μop. As yet another example, the at least one encryption-based μop may include a data pointer encryption μop and the at least one non-encryption-based μop may include a regular, unencrypted load or store μop. As yet another example, the at least one encryption-based μop may include a data pointer decryption μop and the non-encryption-based μop may include a regular, unencrypted load or store μop.

At 206, the non-encryption based μops are expressed as dependent upon the (block) encryption-based μops. This operation may correspond to operation 106 of the process 100, and may accordingly be performed by dependencies logic of the scheduler during generation of an acyclic graph. As an example, in some embodiments, the scheduler may compute dependencies between μops by identifying regular, unencrypted load or store μops that have resulted from the mapping of cryptographic-based instructions into μops as dependent on at least one of a data block encryption μop, a data block decryption μop, a pointer encryption μop, or a pointer decryption μop.

At 208, encryption or decryption timings are added to an acyclic graph that expresses μop dependencies. This operation may correspond to operation 108 of the process 100, whereby the acyclic graph is annotated by timing logic of a scheduler. In some embodiments, the timings are otherwise implicitly taken into account by the scheduler. At 210, the encryption-based μops are scheduled to execute in parallel with independent μops (e.g., those not originating from the cryptographic-based instructions accessed at 202). This operation may correspond to operation 110 of the process 100, whereby the maximal scheduling is performed by scheduling logic of a scheduler. For instance, the scheduling logic that assigns μops to functional units may ensure that data block and pointer encryption/decryption tasks are scheduled to be executed in parallel with other independent μops.

Figure 3:
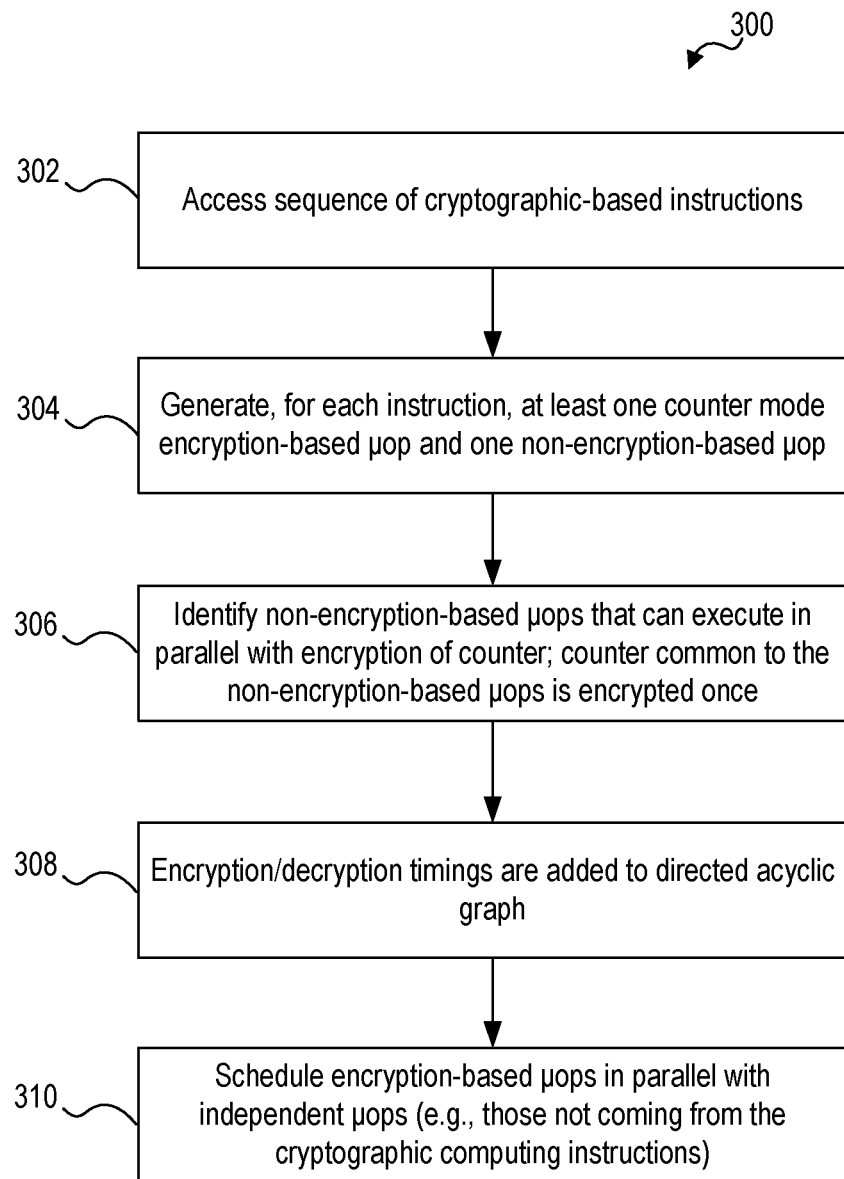
FIG. 3 is a diagram of another example process of scheduling microoperations based on cryptographic-based instructions.

FIG. 3 is a diagram of another example process 300 of scheduling microoperations based on cryptographic-based instructions. In particular, in the example, shown, a block cipher encryption scheme is utilized, and the mode used for data block and pointer encryption is the counter mode. In the counter mode, data are encrypted by being XOR-ed with an almost random value, called the key stream. The key stream may be produced by encrypting counter blocks using a secret key. Counter blocks comprising tweak bits (as well as the bits of a block-by-block increasing counter) may be encrypted with the same key and the resulting encrypted blocks are XOR-ed with the data. Using the counter mode, key stream generation microoperations can be parallelized with microoperations for the reading of the data from memory.

At 302, a sequence of cryptographic-based instruction is accessed. Cryptographic-based instructions may refer to instructions that are to be executed in cryptographic computing systems or environments, where data is stored in memory in encrypted form and decrypted/encrypted within a processor core. An example cryptographic-based instruction includes an encrypted load and store operation. The sequence of instructions may be within a particular window of fixed size as in processes 100, 200.

At 304, at least one counter mode encryption-based µop and at least one non-encryption based µop are generated for each instruction accessed at 302, in a similar manner as described above with respect to 204 of process 200.

At 306, non-encryption-based µops that can execute in parallel with the encryption of the counter are identified, and the counter common to the identified µops is encrypted once (instead of multiple times). This operation may correspond to operation 106 of the process 100, and may accordingly be performed by dependencies logic of the scheduler during generation of an acyclic graph. As an example, the scheduler logic that computes µop dependencies may ensure that regular unencrypted load µops coming from the cryptographic-based instructions are not expressed as dependent on their associated counter encryption µops. In the counter mode, the encryption of the counter blocks may proceed independently from the loading of the data. Hence, the corresponding µops of these two steps may be represented by nodes of two separate parallel branches in the dependencies graph. These branches would merge in a node presenting the XOR operation which adds the encrypted counter to the loaded data, according to the counter mode specification. In some implementations, the dependencies logic of the scheduler may also identify a plurality of load and store µops coming from the cryptographic-based instructions, the associated data of which need to be encrypted or decrypted with the same counter value and key stream. For these µops, the dependencies logic may schedule the computation of the key stream only once and represent it as a single node in the dependencies graph.

At 308, encryption or decryption timings are added to an acyclic graph that expresses µop dependencies. This operation may correspond to operation 108 of the process 100, whereby the acyclic graph is annotated by timing logic of a scheduler. In some embodiments, the timings are otherwise implicitly taken into account by the scheduler. At 310, the encryption-based µops are scheduled to execute in parallel with independent µops (e.g., those not originating from the cryptographic-based instructions accessed at 302). This operation may correspond to operation 110 of the process 100, whereby the maximal scheduling is performed by scheduling logic of the scheduler. For instance, the scheduling logic that assigns µops to functional units may ensure that data block and pointer encryption/decryption tasks are scheduled to be executed in parallel with other independent µops.

The above descriptions have described how an out-of-order-execution scheduler may support the execution of cryptographic-based instructions in cryptographic computing implementations. The following examples describe certain embodiments wherein the functional units of a core support the execution of the microoperations as discussed above. In some of the example embodiments described below, the encryption and decryption of data is done in the load and store buffers, respectively, of a processor core microarchitecture.

Figure 4A:
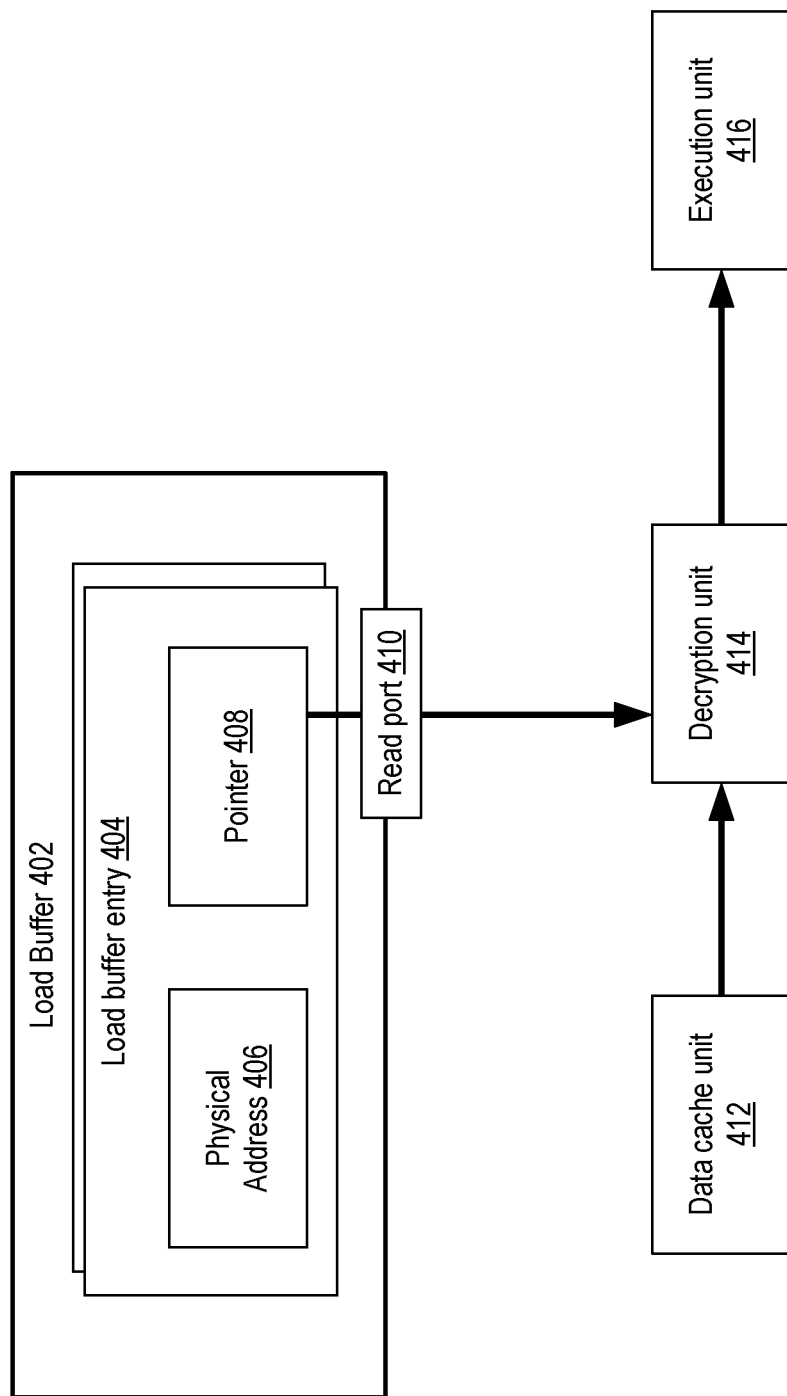
FIGS. 4A-4B are diagrams of an example data decryption process in a cryptographic computing system.
Figure 4B:
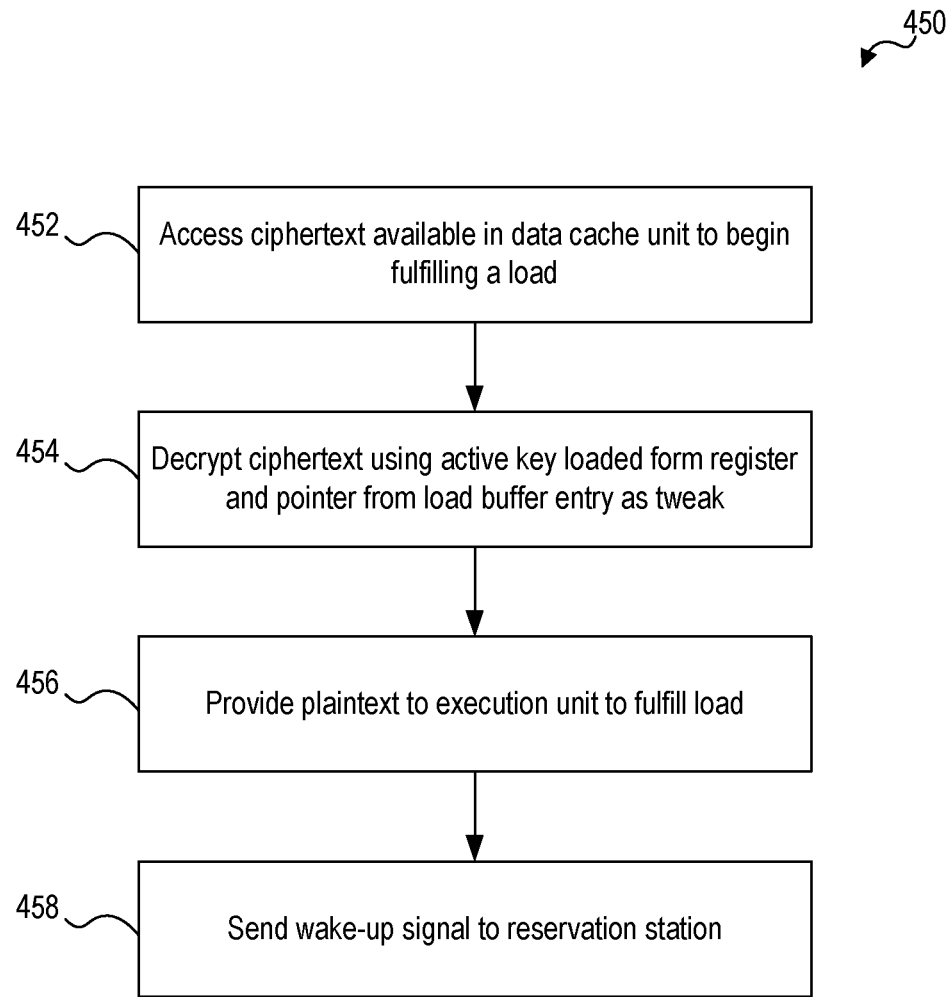

FIGS. 4A-4B are diagrams of an example data decryption process in a cryptographic computing system. In particular, FIG. 4A shows an example system 400 for implementing the example process 450 of FIG. 4B. In certain embodiments, the system 400 is implemented entirely within a processor as part of a cryptographic computing system. The system 400 may, in certain embodiments, be executed in response to a plurality of µops issued by an out-of-order scheduler implementing the process 200 of FIG. 2.

Referring to the example system 400 of FIG. 4A, a load buffer 402 includes one or more load buffer entries 404. The load buffer 402 may be implemented in a memory subsystem of a processor, such as in a memory subsystem of a processor core. Each load buffer entry 404 includes a physical address field 406 and a pointer field 408. In the example shown, a state machine servicing load requests obtains data from a data cache unit 412 (which may, in some implementations be a store buffer), then uses the pointer field 408 (obtained via read port 410) as a tweak in a decryption operation performed on the encrypted data via a decryption unit 414. The decrypted data are then delivered to an execution unit 416 of the processor core microarchitecture. Although shown as being implemented outside (and coupled to) the load buffer 402, the decryption unit 414 may be implemented inside the load buffer 402 in some embodiments.

Referring now to the example process 450 of FIG. 4B, a data cache unit (or store buffer) stores encrypted data (ciphertext) to be decrypted by the decryption unit 414 as described above. At 452, the decryption unit 414 accesses the ciphertext to begin fulfilling a load operation. The decryption unit 414 then decrypts the ciphertext at 454 using an active key obtained from a register along with a tweak value, which, in the example shown, is the value of the pointer field 408 (i.e., the data's linear address). At 456, the decryption unit 414 provides the decrypted plaintext to an execution unit 416 to fulfill the load operation. Finally, at 458, the decryption unit 414 sends a wake-up signal to a reservation station of the processor (which may track the status of register contents and support register renaming).

Figure 5A:
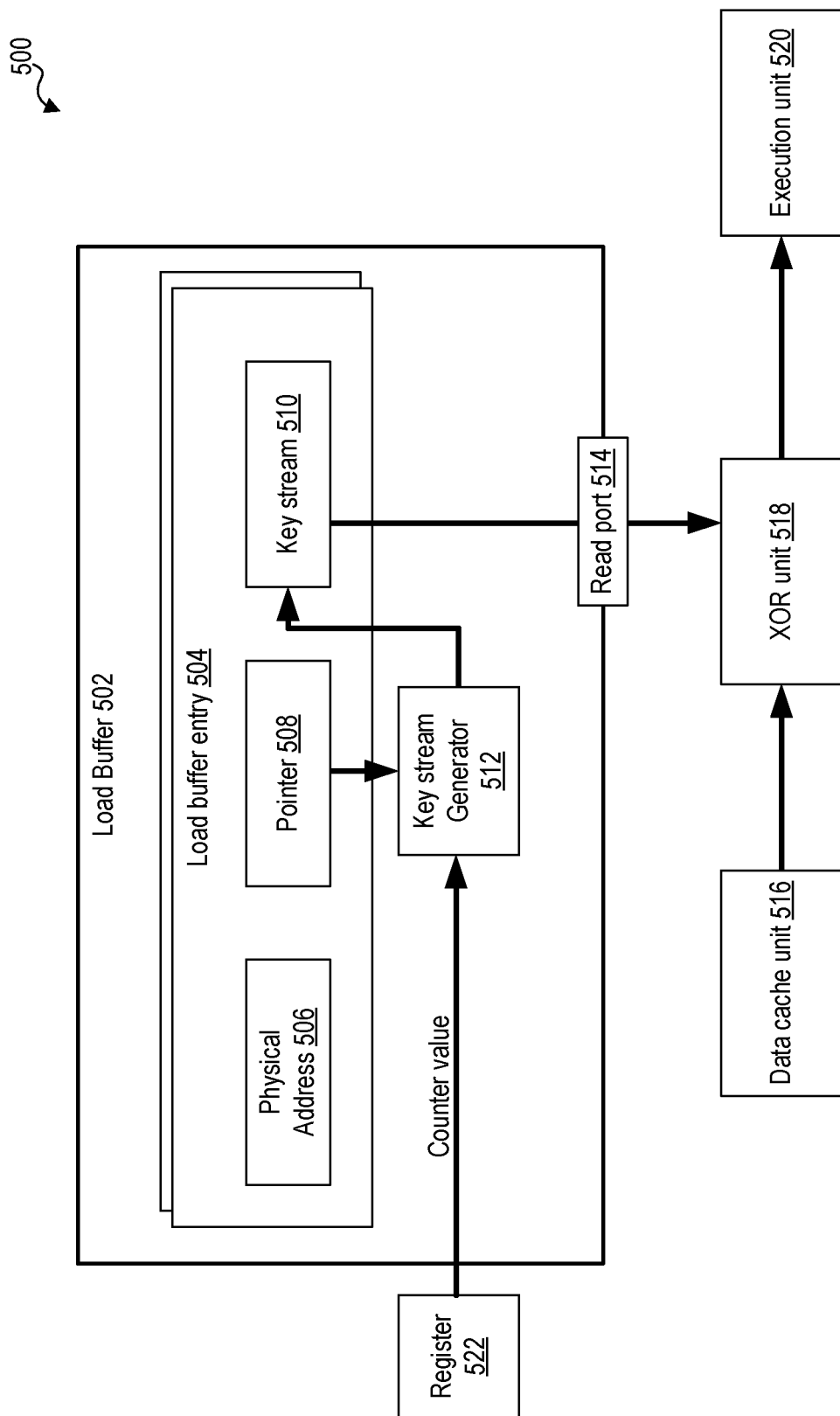

FIGS. 5A-5C are diagrams of another example data decryption process in a cryptographic computing system. In particular, FIG. 5A shows an example system 500 for implementing the example processes 550, 560 of FIGS. 5B, 5C. In certain embodiments, the system 500 is implemented entirely within a processor as part of a cryptographic computing system. In the examples shown in FIGS. 5A-5B, a counter mode block cipher is used for encryption/decryption of data. The system 500 may be executed, in certain embodiments, in response to a plurality of µops issued by an out-of-order scheduler implementing the process 300 of FIG. 3.

Referring to the example system 500 of FIG. 5A, a load buffer 502 includes one or more load buffer entries 504. The load buffer 502 may be implemented in a memory subsystem of a processor, such as in a memory subsystem of a processor core. Each load buffer entry 504 includes a physical address field 506, a pointer field 508, and a key stream 510. In the example shown, since the counter mode is being used, the key stream generator 512 produces the key stream 510 by encrypting a counter value loaded from the register 522. The pointer field 508 of the load buffer entry 504 tweaks the encryption operation performed by the key stream generator 512. The encryption performed by the key stream generator 512 may be tweaked by other fields, such as, for example, other cryptographic context values. An XOR operation is then performed on the key stream 510 by the XOR unit 518 (which reads the key stream 510 via the read port 514) and encrypted data coming from the data cache unit 516 (which may, in some embodiments, be a store buffer). The decrypted data are then delivered to an execution unit 520 of the processor core microarchitecture. Although shown as being implemented inside the load buffer 502, the key stream generator 512 may be implemented outside the load buffer 502 in some embodiments. Further, although shown as being implemented outside (and coupled to) the load buffer 502, the XOR unit 518 may be implemented inside the load buffer 502 in some embodiments.

Referring now to the example process 550 of FIG. 5B, at 552, a load buffer entry 504 is created. At 554, a key stream generator 512 is invoked. The key stream generator 512 uses a key obtained from a register along with a tweak value (which, in the example shown, is the pointer value 508) to generate a key stream 510, which is stored in the load buffer entry 504.

Referring now to the example process 560 of FIG. 5C (which may execute independently from the process 550 of FIG. 5B), the ciphertext associated with the load operation may become available from a data cache unit (or store buffer). At 562, the cipher text is accessed, and at 564, the ciphertext is XOR-ed with the key stream 510. At 564, the result of the XOR operation is provided to an execution unit 520 of the processor core microarchitecture to fulfill the load operation. Finally, at 568, a wake-up signal is sent to a reservation station of the processor.

Figure 6A:
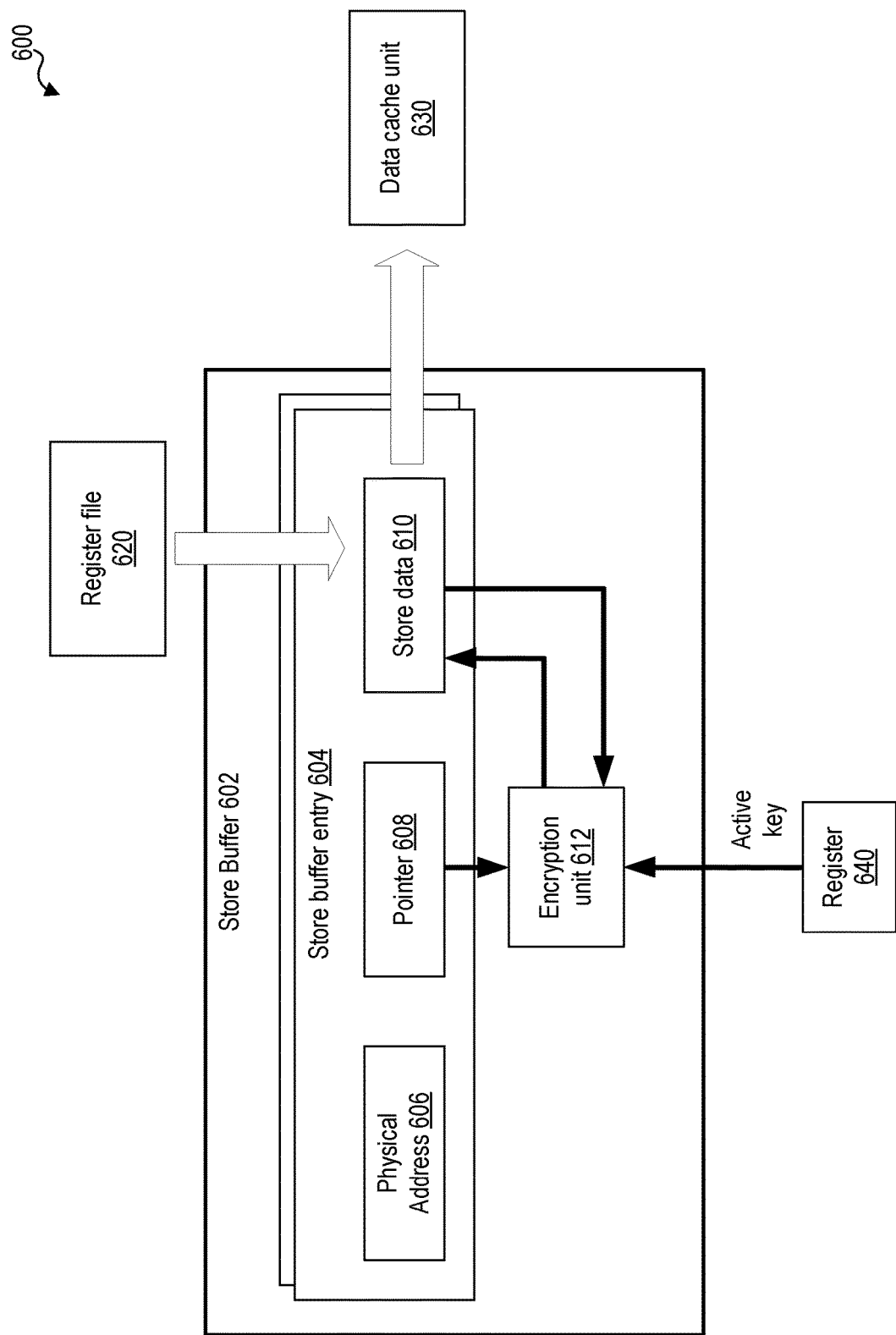
FIGS. 6A-6B are diagrams of an example data encryption process in a cryptographic computing system.
Figure 6B:
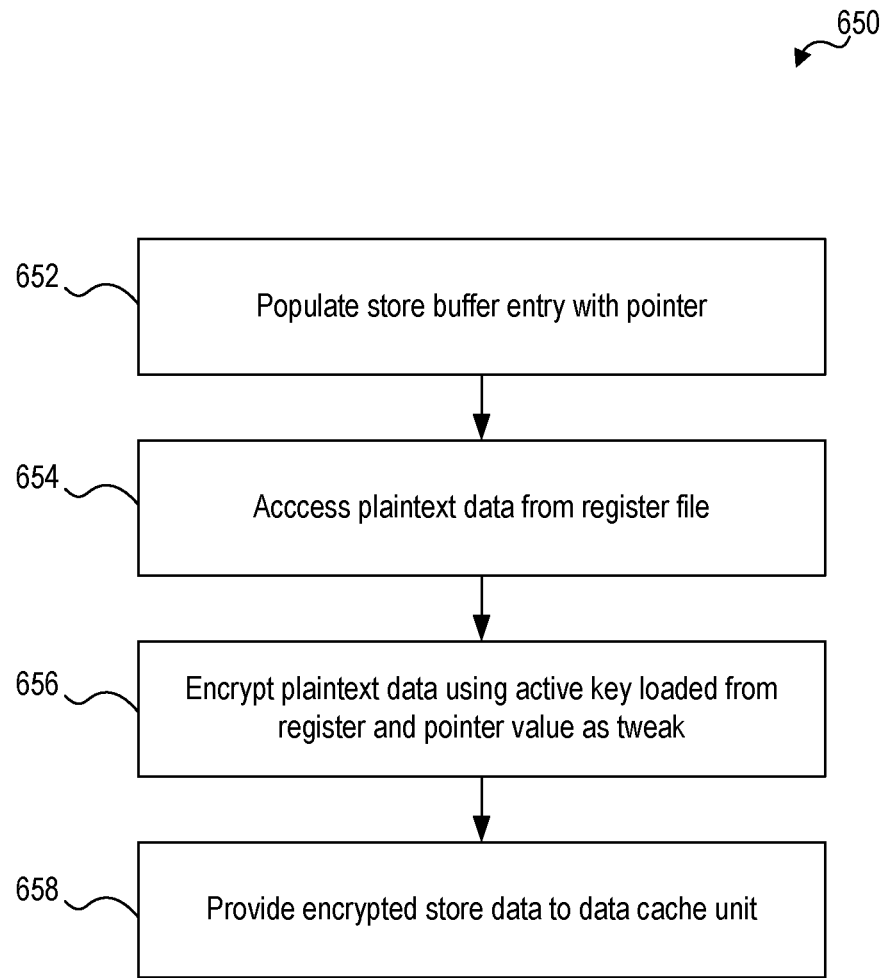

FIGS. 6A-6B are diagrams of an example data encryption process in a cryptographic computing system. In particular, FIG. 6A shows an example system 600 for implementing the example process 650 of FIG. 6B. In certain embodiments, the system 600 is implemented entirely within a processor as part of a cryptographic computing system. The system 600 may, in certain embodiments, be executed in response to a plurality of μops issued by an out-of-order scheduler implementing the process 200 of FIG. 2.

Referring to the example system 600 shown in FIG. 6A, a store buffer 602 includes one or more store buffer entries 604. The store buffer 602 may be implemented in a memory subsystem of a processor, such as in a memory subsystem of a processor core. Each store buffer entry 604 includes a physical address field 606, a pointer field 608, and store data 610 (which is to be stored). In the example shown, a state machine servicing store requests obtains data from a register file 620 (or execution unit), and an encryption unit 612 uses the pointer field 608 as a tweak during an encryption operation performed on the data obtained from the register file 620. The encrypted data are then passed to a data cache unit 630 (or other execution unit of the CPU core microarchitecture). Although shown as being implemented inside the store buffer 602, the encryption unit 612 may be implemented outside the store buffer 602 in some embodiments.

Referring now to the example process 650 of FIG. 6B, plaintext data to be encrypted is available from a register file 620. At 652, the store buffer entry 604 is populated with a pointer value 608. At 654, the plaintext data is accessed from the register file 620 and at 656, the plaintext data is encrypted by the encryption unit 612 using an active key obtained from a register 640 along with a tweak (which, in the example shown, is the value of the pointer field 408 (i.e., the data's linear address)) and stored in the store buffer entry 604 as store data 610. At 658, the encrypted store data 610 is provided to a data cache unit 630 (or another waiting execution unit, in some implementations).

In some implementations, the pointer values used in the encryption and decryption operations may themselves be encrypted for security purposes. The pointer values may be entirely or partially encrypted (that is, only a portion of the bits of the pointer value may be encrypted). In these instances, the encrypted pointer values may first be decrypted prior to being used in the encryption/decryption operations described above. FIGS. 7A-7B and 8A-8B describe example embodiments for decrypting pointer values prior to use in the encryption/decryption operations.

Figure 7A:
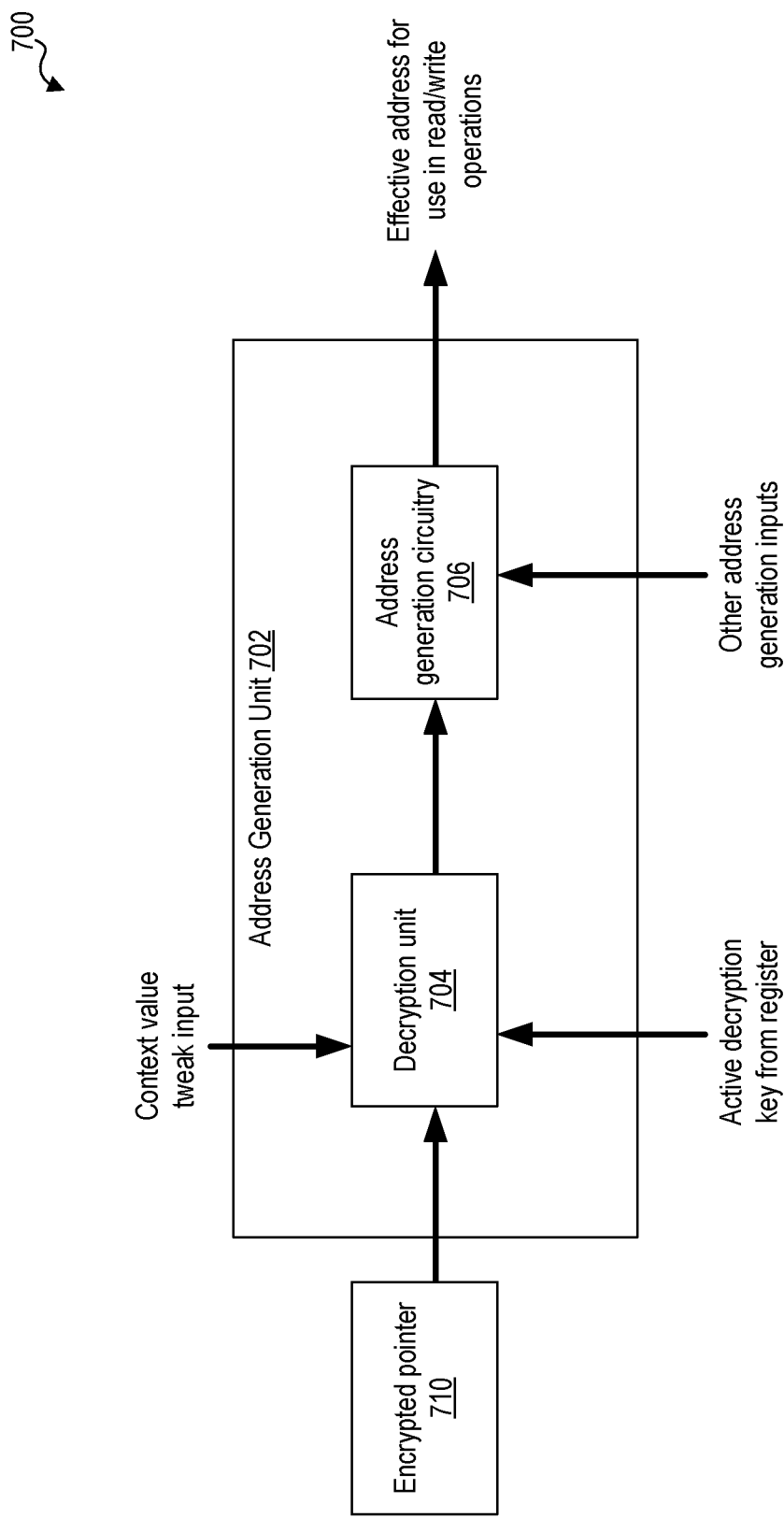
FIGS. 7A-7B are diagrams of an example pointer decryption process in a cryptographic computing system.
Figure 7B:
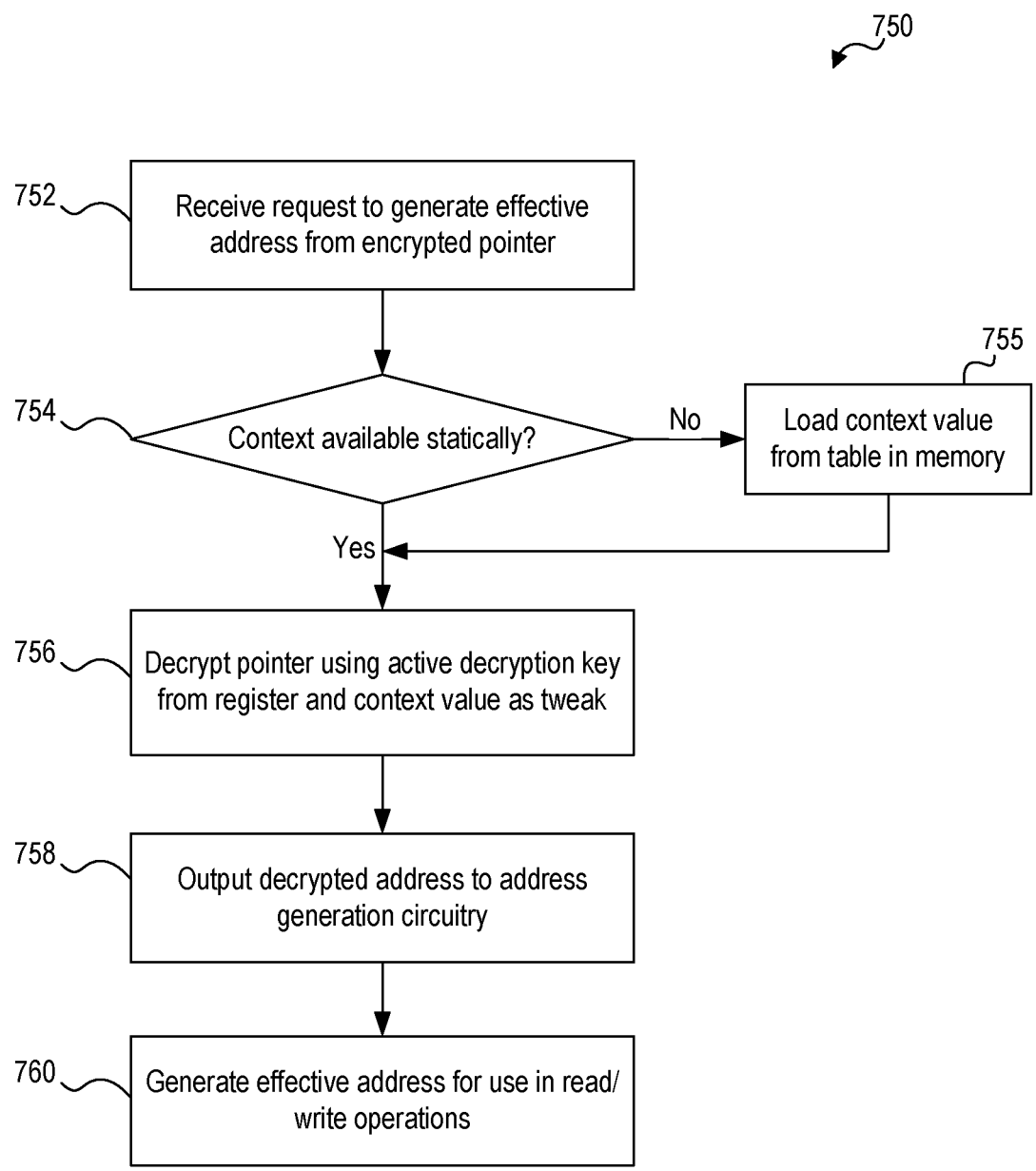

FIGS. 7A-7B are diagrams of an example pointer decryption process in a cryptographic computing system. In particular, FIG. 7A shows an example system 700 for implementing the example process 750 of FIG. 7B. In certain embodiments, the system 700 is implemented entirely within a processor as part of a cryptographic computing system. The system 700 may, in certain embodiments, be executed in response to a plurality of μops issued by an out-of-order scheduler implementing the process 200 of FIG. 2 or the process 300 of FIG. 3.

Referring to the example system 700 shown in FIG. 7A, an address generation unit 702 is configured to decrypt parts of a linear address, which are encrypted for security. A decryption unit 704 in the address generation unit 702 accepts as input an encrypted pointer 710 representing a first encoded linear address, along with a key obtained from a register and a context value tweak input (e.g., the tweak input may come from a separate register, or may consist of unencrypted bits of the same linear address). The decryption unit 704 outputs a decrypted subset of the bits of the encrypted pointer 710, which are then passed to address generation circuitry 706 within the address generation unit 702 along with other address generation inputs. The address generation circuitry 706 generates a second effective linear address to be used in a memory read or write operation based on the inputs.

Referring now to the example process 750 shown in FIG. 7B, the tweak value (which is also described in FIG. 7B as the "context value") may be available either statically or dynamically—if it is not available statically, it is loaded dynamically from memory. At 752, request to generate an effective address from an encrypted pointer 710 is received by an address generation unit 702. The address generation unit 702 determines at 754 whether a context value is available statically. If it is available statically, then the value is used at 756; if not, the context value is loaded dynamically from a table in memory at 755. The process then proceeds to 756, where the encrypted pointer 710 is decrypted using an active decryption key obtained from a register along with the obtained context value. At 758, a decrypted address is output to the address generation circuitry 706, which then generates, at 760, an effective address for use in read/write operations based on the decrypted address (and any other address generation inputs).

Figure 8A:
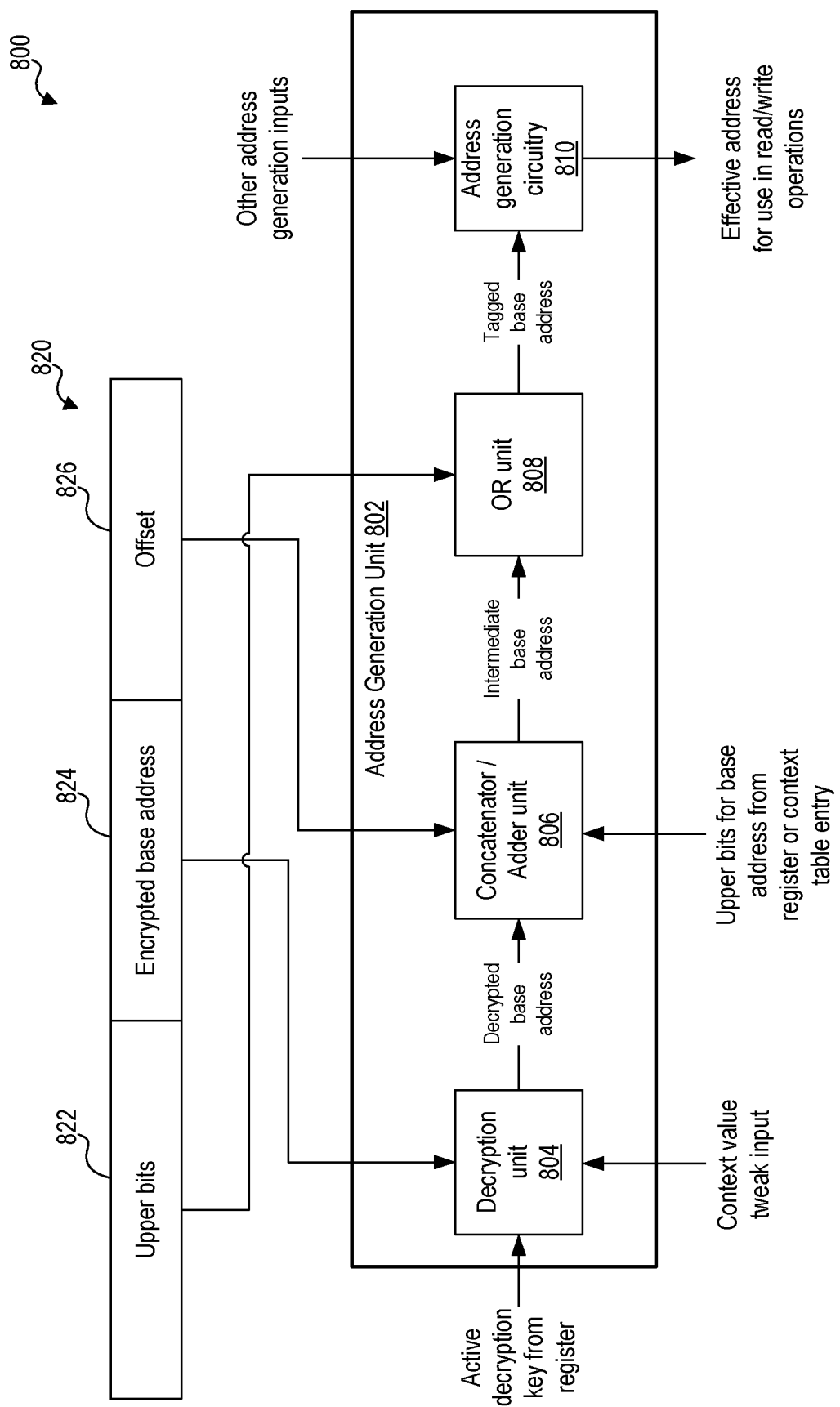
FIGS. 8A-8B are diagrams of an example base address slice decryption process in a cryptographic computing system.
Figure 8B:
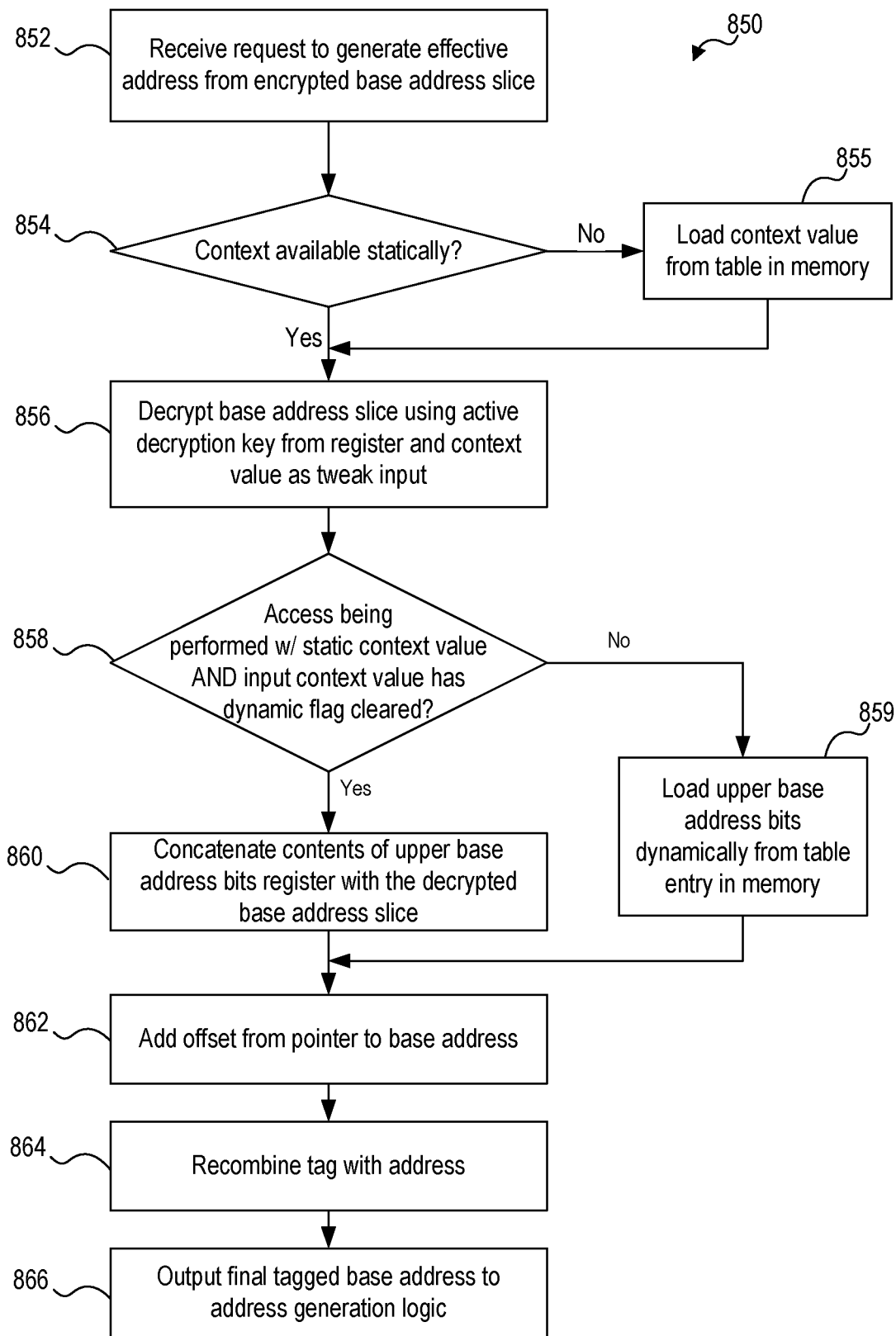

FIGS. 8A-8B are diagrams of an example base address slice decryption process in a cryptographic computing system. In particular, FIG. 8A shows an example system 800 for implementing the example process 850 of FIG. 8B. In certain embodiments, the system 800 is implemented entirely within a processor as part of a cryptographic computing system. The system 800 may, in certain embodiments, be executed in response to a plurality of μops issued by an out-of-order scheduler implementing the process 200 of FIG. 2 or the process 300 of FIG. 3.

Referring to the example system 800 shown in FIG. 8A, a generation unit 802 is configured to decrypt parts of a linear address, as described above with respect to FIGS. 7A-7B. However, in the example shown, the bit set that is encrypted (i.e., slice 824) occupies a middle slice of an encoded linear address 820 rather than the entire address being encrypted as in the examples described above with respect to FIGS. 7A-7B. The upper bits 822 of the encoded linear address 820 may denote the data object size, type, format, or other security information associated with the encoded linear address 820. The encoded linear address 820 also includes an offset 826.

In the example shown, a decryption unit 804 in the address generation unit 802 accepts as input the encrypted base address slice 824, along with a key obtained from a register and a context value tweak input (e.g., the tweak input may come from a separate register, or may consist of unencrypted bits of the same linear address). The decryption unit 804 outputs a decrypted base address. The decrypted base address slice is then provided to a concatenator/adder unit 806, which concatenates the decrypted base address with a set of complementary upper bits from a register or context table entry and the offset 826 to yield an intermediate base address. In certain embodiments, the set of complementary bits is different from the upper bits 822, and the set of complementary does not convey metadata information (e.g., data object size, type, format, etc.) but instead includes the missing bits of the effective linear address that is constructed, denoting a location in the linear address space.

The intermediate base address is then combined with the upper bits 822 by the OR unit 808 to yield a tagged base address. In other embodiments, the upper bits 822 may be combined using an XOR unit, an ADD unit or a logical AND unit. In yet other embodiments, the upper bits 822 may act as a tweak value and tweak the decryption of the middle slice of the address. The tagged base address is then provided to address generation circuitry 810 in the address generation unit 802, along with other address generation inputs. The address generation circuitry 810 then generates an effective address to be used in a memory read or write operation based on the inputs. In one embodiment, the upper bits 822 may be used to determine a number of intermediate lower address bits (e.g., from offset 826) that would be used as a tweak to the encrypted base address 824.

For embodiments with an encrypted base address, a Translation Lookaside Buffer (TLB) may be used that maps linear addresses (which may also be referred to as virtual addresses) to physical addresses. A TLB entry is populated after a page miss where a page walk of the paging structures determines the correct linear to physical memory mapping, caching the linear to physical mapping for fast lookup. As an optimization, a TLB (for example, the data TLB or dTLB) may instead cache the encoded address 820 to physical address mapping, using a Content Addressable Memory (CAM) circuit to match the encrypted/encoded address 820 to the correct physical address translation. In this way, the TLB may determine the physical memory mapping prior to the completion of the decryption unit 804 revealing the decrypted linear address, and may immediately proceed with processing the instructions dependent on this cached memory mapping. Other embodiments may instead use one or both of the offset 826 and upper bits 822 of the address 820 as a partial linear address mapping into the TLB (that is, the TLB lookup is performed only against the plaintext subset of the address 820), and proceed to use the physical memory translation, if found, verifying the remainder of the decrypted base address (824) to determine the full linear address is a match (TLB hit) after completion of the decryption 804. Such embodiments may speculatively proceed with processing and nuke the processor pipeline if the final decrypted linear address match is found to be a false positive hit in the TLB, preventing the execution of dependent instructions, or cleaning up the execution of dependent instructions by returning processor register state and/or memory to its prior state before the TLB misprediction (incorrect memory mapping).

In some embodiments, a subset of the upper bits 822 indicates address adjustment, which may involve adding offset value (which is a power of two) to the effective linear address that is produced by the address generation unit. The offset value may include a bit string where only a single bit is equal to 1 and all other bits are equal to zero. In some other embodiments, address adjustment may involve subtracting from the effective linear address an offset value, which is a power of two. Adjustment may be included in certain implementations because some memory object allocations cross power of two boundaries. In some embodiments, the smallest power-of-two box that contains a memory object allocation is also a unique property of the allocation and may be used for cryptographically tweaking the encryption the base address 824 associated with the allocation. If address adjustment is not supported, allocations that cross power of two boundaries may be associated with exceedingly large power-of-two boxes. Such large boxes may be polluted with data of other allocations, which, even though cryptographically isolated, may still be accessed by software (e.g., as a result of a software bug). The adjustment may proceed in parallel with the decryption of the base address bits 824. In certain embodiments, performing the adjustment involves: (i) passing the upper bits 822 though a decoder circuit, (ii) obtaining the outputs of the decoder circuit; (iii) using those decoder outputs together with a first offset value 826 to form a second offset value to add to the bits of the linear address which are unencrypted; (iv) obtain a carry out value from this addition; (v) add the carry out value to the decrypted address bits 824 once they are produced. In other embodiments, a partial TLB lookup process may begin as soon as the adjustment process has produced the linear address bits which are used by the partial TLB lookup process.

Referring now to the example process 850 shown in FIG. 8B, as in FIG. 7B, the tweak value (also described in FIG. 8B as the "context value") may be available either statically or dynamically—if it is not available statically, it is loaded dynamically from memory. In particular, at 852, request to generate an effective address from an encrypted base address slice 824 is received by an address generation unit 802. The address generation unit 802 determines at 854 whether a context value is available statically. If it is available statically, then the value is used at 856; if not, the context value is loaded dynamically from a table in memory at 855. At 856, the encrypted base address slice 824 is decrypted using an active decryption key obtained from a register along with the context value.

At 858, the address generation unit 802 determines whether both (1) the memory access is being performed with a static context value, and (2) the input context value has its dynamic flag bit cleared. The dynamic flag bit may be a flag bit in the pointer that indicates whether context information is available statically or dynamically. For instance, if an object represented by the pointer is not entirely within the bounds of a statically addressable memory region, then a dynamic flag bit may be set in the pointer. The dynamic flag bit may indicate that context information is to be dynamically obtained, for example, via a pointer context table. In other words, there may be a region of memory in which the upper bits for a base address can be supplied statically from a control register, and allocations outside that region may need to draw their upper bits for the base address dynamically from a table entry in memory.

If both of the conditions are true at 858, the process 850 moves to 860; if one or both are not true, then the upper base address bits are loaded dynamically from a table entry in memory at 859 before proceeding to 860. In some cases, the operations of 858 can be performed alongside those of 854, or the operations may be merged. Likewise, in some cases, the operations of 859 can be performed alongside those of 855, or the operations may be merged.

At 860, the concatenator/adder unit 806 of the address generation unit 802 concatenates the upper base address bits with the decrypted base address slice, and at 862, adds the offset 826 to the concatenation. At 864, the address generation unit 802 recombines tag information from the upper bits 822 with the result of the concatenation/addition of 860 and 862 via the OR unit 808. The result of the concatenation, addition, and ORing is provided to address generation circuitry 810 in the address generation unit 802, along with other address generation inputs. At 866, the address generation circuitry 810 generates an effective address to be used in a memory read or write operation based on the inputs.

Figure 9:
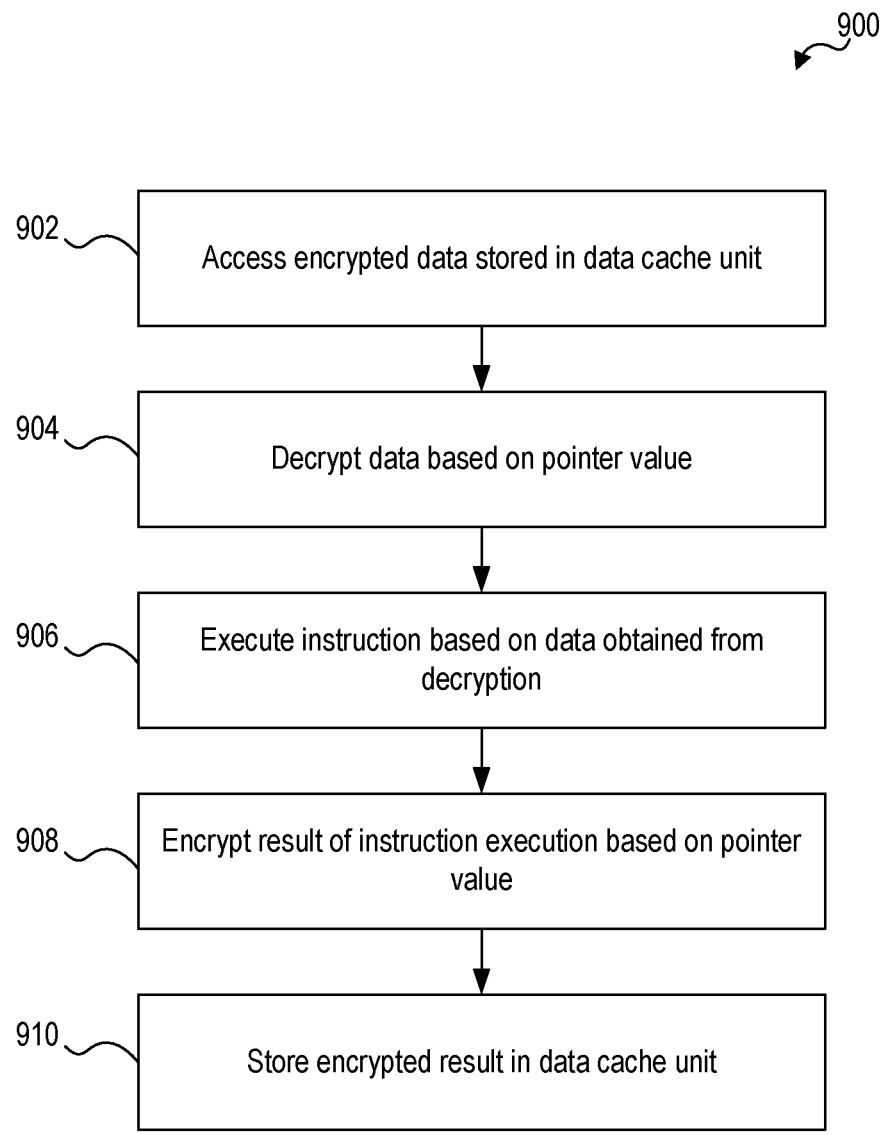
FIG. 9 is a flow diagram of an example process of executing cryptographic-based instructions in a cryptographic computing system.

FIG. 9 is a flow diagram of an example process 900 of executing cryptographic-based instructions in a cryptographic computing system. The example process 900 may be performed by circuitry of a microprocessor pipeline of a processor (e.g., one or more of the components described above, which may be implemented in a processor configured similar to the processor 1000 of FIG. 10) in response to accessing a set of cryptographic-based instructions. In some embodiments, the circuitry of the microprocessor pipeline performs each of the operations described, while in other embodiments, the circuitry of the microprocessor pipeline performs only a subset of the operations described.

At 902, encrypted data stored in a data cache unit of a processor (e.g., data cache unit 412 of FIG. 4A, data cache unit 516 of FIG. 5A, or data cache unit 1024 of FIG. 10) is accessed.

At 904, the encrypted data is decrypted based on a pointer value. The decryption may be performed in manner similar to that described above with respect to FIGS. 4A-4B, FIGS. 5A-5B, or in another manner. In some instances, the pointer value or a portion thereof may itself be encrypted. In these instances, the pointer value may first be decrypted/decoded, for example, in a similar manner to that described above with respect to FIGS. 7A-7B or FIGS. 8A-8B.

At 906, a cryptographic-based instruction is executed based on data obtained from the decryption performed at 904. The instruction may be executed on an execution unit of the processor (e.g., execution unit 416 of FIG. 4A, execution unit 520 of FIG. 5A, or execution unit(s) 1016 of FIG. 10).

At 908, a result of the execution performed at 906 is encrypted based on another pointer value. The encryption may be performed in a similar manner to that described above with respect to FIGS. 6A-6B.

At 910, the encrypted result is stored in a data cache unit of the processor or another execution unit.

The example processes described above may include additional or different operations, and the operations may be performed in the order shown or in another order. In some cases, one or more of the operations shown in the flow diagrams are implemented as processes that include multiple operations, sub-processes, or other types of routines. In some cases, operations can be combined, performed in another order, performed in parallel, iterated, or otherwise repeated or performed in another manner. Further, although certain functionality is described herein as being performed by load or store buffers, address generation units, or other certain aspects of a processor, it will be understood that the teachings of the present disclosure may be implemented in other examples by other types of execution units in a processor, including but not limited to separate data block encryption units, separate key stream generation units, or separate data pointer decryption units.

Figure 10:
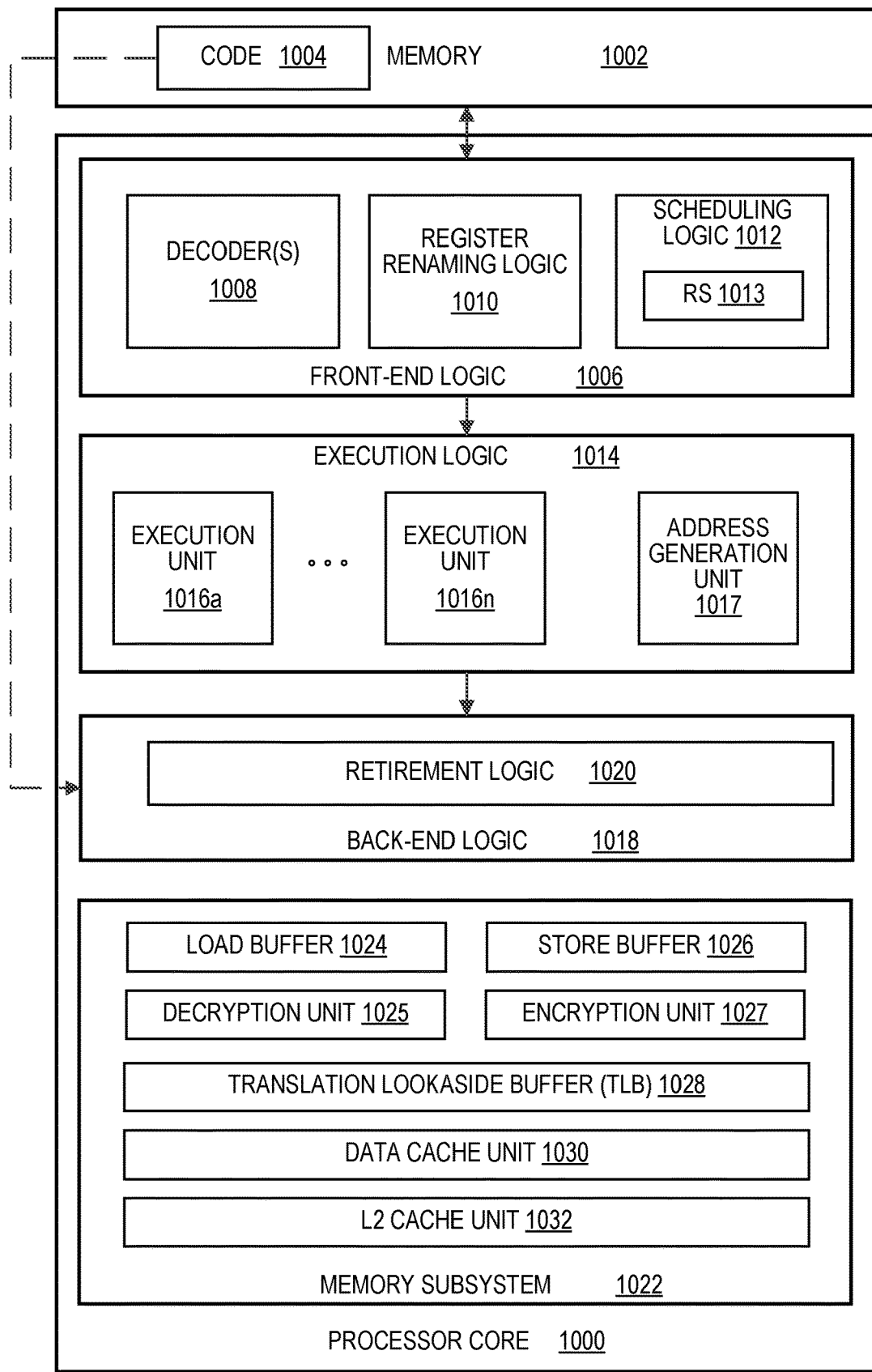
FIG. 10 is a block diagram illustrating an example processor core and memory according to at least one embodiment.
Figure 12:
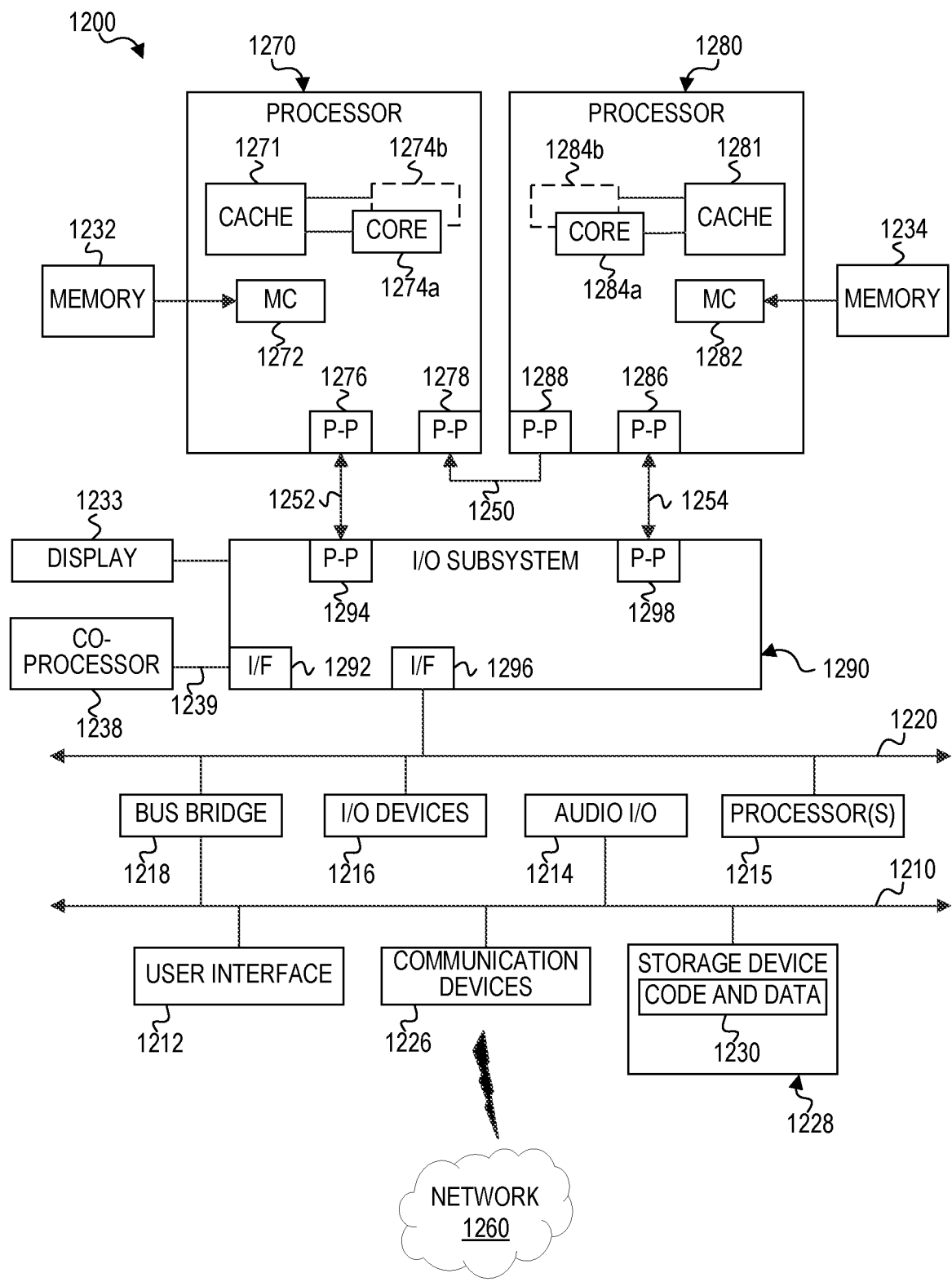
FIG. 12 is a block diagram of an example computer architecture according to at least one embodiment.

FIGS. 10-12 are block diagrams of example computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 10-12.

FIG. 10 is an example illustration of a processor according to an embodiment. Processor 1000 is an example of a type of hardware device that can be used in connection with the implementations above. Processor 1000 may be any type of processor, such as a microprocessor, an embedded processor, a digital signal processor (DSP), a network processor, a multi-core processor, a single core processor, or other device to execute code. Although only one processor 1000 is illustrated in FIG. 10, a processing element may alternatively include more than one of processor 1000 illustrated in FIG. 10. Processor 1000 may be a single-threaded core or, for at least one embodiment, the processor 1000 may be multi-threaded in that it may include more than one hardware thread context (or "logical processor") per core.

FIG. 10 also illustrates a memory 1002 coupled to processor 1000 in accordance with an embodiment. Memory 1002 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1000 can execute any type of instructions associated with algorithms, processes, or operations detailed herein. Generally, processor 1000 can transform an element or an article (e.g., data) from one state or thing to another state or thing.

Code 1004, which may be one or more instructions to be executed by processor 1000, may be stored in memory 1002, or may be stored in software, hardware, firmware, or any suitable combination thereof, or in any other internal or external component, device, element, or object where appropriate and based on particular needs. In one example, processor 1000 can follow a program sequence of instructions indicated by code 1004. Each instruction enters a front-end logic 1006 and is processed by one or more decoders 1008. The decoder may generate, as its output, a microoperation such as a fixed width microoperation in a predefined format, or may generate other instructions, microinstructions, or control signals that reflect the original code instruction. Front-end logic 1006 also includes register renaming logic 1010 and scheduling logic 1012 (which includes a reservation station 1013), which generally allocate resources and queue the operation corresponding to the instruction for execution. In some embodiments, the scheduling logic 1012 includes an in-order or an out-of-order execution scheduler.

Processor 1000 can also include execution logic 1014 having a set of execution units 1016a, ..., 1016n, an address generation unit 1017, etc. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor 1000 allows out of order execution but requires in order retirement of instructions. Retirement logic 1020 may take a variety of known forms (e.g., re-order buffers or the like). In this manner, processor 1000 is transformed during execution of code 1004, at least in terms of the output generated by the decoder, hardware registers and tables utilized by register renaming logic 1010, and any registers (not shown) modified by execution logic 1014.

Processor 1000 can also include a memory subsystem 1022, which includes a load buffer 1024, a decryption unit 1025, a store buffer 1026, an encryption unit 1027, a Translation Lookaside Buffer (TLB) 1028, a data cache unit (DCU) 1030, and a Level-2 (L2) cache unit 1032. The load buffer 1024 processes microoperations for memory/cache load operations, while the store buffer 1026 processes microoperations for memory/cache store operations. In cryptographic computing systems, the data stored in the data cache unit 1030, the L2 cache unit 1032, and/or the memory 1002 may be encrypted, and may be encrypted (prior to storage) and decrypted (prior to processing by one or more execution units 1016) entirely within the processor 1000 as described herein. Accordingly, the decryption unit 1025 may decrypt encrypted data stored in the DCU 1030, e.g., during load operations processed by the load buffer 1024 as described above, and the encryption unit 1027 may encrypt data to be stored in the DCU 1030, e.g., during stored operations processed by the store buffer 1026 as described above. In some embodiments, the decryption unit 1025 may be implemented inside the load buffer 1024 and/or the encryption unit 1027 may be implemented inside the store buffer 1026. The Translation Lookaside Buffer (TLB) 1028 maps linear addresses to physical addresses and performs other functionality as described herein.

Although not shown in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches. In some embodiments, non-volatile memory (such as flash memory or fuses) may also be included on the chip with processor 1000.

FIG. 11A is a block diagram illustrating both an example in-order pipeline and an example register renaming, out-of-order issue/execution pipeline according to one or more embodiments of this disclosure. FIG. 11B is a block diagram illustrating both an example embodiment of an in-order architecture core and an example register renaming, out-of-order issue/execution architecture core to be included in a processor according to one or more embodiments of this disclosure. The solid lined boxes in FIGS. 11A-11B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 11A, a processor pipeline 1100 includes a fetch stage 1102, a length decode stage 1104, a decode stage 1106, an allocation stage 1108, a renaming stage 1110, a schedule (also known as a dispatch or issue) stage 1112, a register read/memory read stage 1114, an execute stage 1116, a write back/memory write stage 1118, an exception handling stage 1122, and a commit stage 1124.

FIG. 11B shows processor core 1190 including a front end unit 1130 coupled to an execution engine unit 1150, and both are coupled to a memory unit 1170. Processor core 1190 and memory unit 1170 are examples of the types of hardware that can be used in connection with the implementations shown and described herein. The core 1190 may be a reduced instruction set computing (RISC) core, a complex instruction set computing (CISC) core, a very long instruction word (VLIW) core, or a hybrid or alternative core type. As yet another option, the core 1190 may be a special-purpose core, such as, for example, a network or communication core, compression engine, coprocessor core, general purpose computing graphics processing unit (GPGPU) core, graphics core, or the like. In addition, processor core 1190 and its components represent example architecture that could be used to implement logical processors and their respective components.

The front end unit 1130 includes a branch prediction unit 1132 coupled to an instruction cache unit 1134, which is coupled to an instruction translation lookaside buffer (TLB) unit 1136, which is coupled to an instruction fetch unit 1138, which is coupled to a decode unit 1140. The decode unit 1140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1190 includes a microcode ROM or other medium that stores microcode for certain macroinstructions (e.g., in decode unit 1140 or otherwise within the front end unit 1130). The decode unit 1140 is coupled to a rename/allocator unit 1152 in the execution engine unit 1150.

The execution engine unit 1150 includes the rename/allocator unit 1152 coupled to a retirement unit 1154 and a set of one or more scheduler unit(s) 1156. The scheduler unit(s) 1156 represents any number of different schedulers, including reservation stations, central instruction window, etc. The scheduler unit(s) 1156 is coupled to the physical register file(s) unit(s) 1158. Each of the physical register file(s) units 1158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1158 comprises a vector registers unit, a write mask registers unit, and a scalar registers unit. These register units may provide architectural vector registers, vector mask registers, and general purpose registers (GPRs). In at least some embodiments described herein, register units 1158 are examples of the types of hardware that can be used in connection with the implementations shown and described herein (e.g., registers 112). The physical register file(s) unit(s) 1158 is overlapped by the retirement unit 1154 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1154 and the physical register file(s) unit(s) 1158 are coupled to the execution cluster(s) 1160. The execution cluster(s) 1160 includes a set of one or more execution units 1162 and a set of one or more memory access units 1164. The execution units 1162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Execution units 1162 may also include an address generation unit (AGU) to calculate addresses used by the core to access main memory and a page miss handler (PMH).

The scheduler unit(s) 1156, physical register file(s) unit(s) 1158, and execution cluster(s) 1160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1164). It should also be understood that where separate pipelines are used, one or more of these pipelines may be out-of-order issue/execution and the rest in-order.

The set of memory access units 1164 is coupled to the memory unit 1170, which includes a data TLB unit 1172 coupled to a data cache unit 1174 coupled to a level 2 (L2) cache unit 1176. In one example embodiment, the memory access units 1164 may include a load unit, a store address unit, and a store data unit, each of which is coupled to the data TLB unit 1172 in the memory unit 1170. The instruction cache unit 1134 is further coupled to a level 2 (L2) cache unit 1176 in the memory unit 1170. The L2 cache unit 1176 is coupled to one or more other levels of cache and eventually to a main memory. In addition, a page miss handler may also be included in core 1190 to look up an address mapping in a page table if no match is found in the data TLB unit 1172.

By way of example, the example register renaming, out-of-order issue/execution core architecture may implement the pipeline 1100 as follows: 1) the instruction fetch 1138 performs the fetch and length decoding stages 1102 and 1104; 2) the decode unit 1140 performs the decode stage 1106; 3) the rename/allocator unit 1152 performs the allocation stage 1108 and renaming stage 1110; 4) the scheduler unit(s) 1156 performs the schedule stage 1112; 5) the physical register file(s) unit(s) 1158 and the memory unit 1170 perform the register read/memory read stage 1114; the execution cluster 1160 perform the execute stage 1116; 6) the memory unit 1170 and the physical register file(s) unit(s) 1158 perform the write back/memory write stage 1118; 7) various units may be involved in the exception handling stage 1122; and 8) the retirement unit 1154 and the physical register file(s) unit(s) 1158 perform the commit stage 1124.

The core 1190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology). Accordingly, in at least some embodiments, multi-threaded enclaves may be supported.

While register renaming is described in the context of out-of-order execution, it should be understood that register renaming may be used in an in-order architecture. While the illustrated embodiment of the processor also includes separate instruction and data cache units 1134/1174 and a shared L2 cache unit 1176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 12 illustrates a computing system 1200 that is arranged in a point-to-point (PtP) configuration according to an embodiment. In particular, FIG. 12 shows a system where processors, memory, and input/output devices are interconnected by a number of point-to-point interfaces. Generally, one or more of the computing systems or computing devices described herein may be configured in the same or similar manner as computing system 1200.

Processors 1270 and 1280 may be implemented as single core processors 1274a and 1284a or multi-core processors 1274a-1274b and 1284a-1284b. Processors 1270 and 1280 may each include a cache 1271 and 1281 used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 1270 and 1280 may also each include integrated memory controller logic (MC) 1272 and 1282 to communicate with memory elements 1232 and 1234, which may be portions of main memory locally attached to the respective processors. In alternative embodiments, memory controller logic 1272 and 1282 may be discrete logic separate from processors 1270 and 1280. Memory elements 1232 and/or 1234 may store various data to be used by processors 1270 and 1280 in achieving operations and functionality outlined herein.

Processors 1270 and 1280 may be any type of processor, such as those discussed in connection with other figures. Processors 1270 and 1280 may exchange data via a point-to-point (PtP) interface 1250 using point-to-point interface circuits 1278 and 1288, respectively. Processors 1270 and 1280 may each exchange data with an input/output (I/O) subsystem 1290 via individual point-to-point interfaces 1252 and 1254 using point-to-point interface circuits 1276, 1286, 1294, and 1298. I/O subsystem 1290 may also exchange data with a high-performance graphics circuit 1238 via a high-performance graphics interface 1239, using an interface circuit 1292, which could be a PtP interface circuit. In one embodiment, the high-performance graphics circuit 1238 is a special-purpose processor, such as, for example, a high-throughput MIC processor, a network or communication processor, compression engine, graphics processor, GPGPU, embedded processor, or the like. I/O subsystem 1290 may also communicate with a display 1233 for displaying data that is viewable by a human user. In alternative embodiments, any or all of the PtP links illustrated in FIG. 12 could be implemented as a multi-drop bus rather than a PtP link.

I/O subsystem 1290 may be in communication with a bus 1220 via an interface circuit 1296. Bus 1220 may have one or more devices that communicate over it, such as a bus bridge 1218 and I/O devices 1216. Via a bus 1210, bus bridge 1218 may be in communication with other devices such as a user interface 1212 (such as a keyboard, mouse, touchscreen, or other input devices), communication devices 1226 (such as modems, network interface devices, or other types of communication devices that may communicate through a computer network 1260), audio I/O devices 1214, and/or a data storage device 1228. Data storage device 1228 may store code and data 1230, which may be executed by processors 1270 and/or 1280. In alternative embodiments, any portions of the bus architectures could be implemented with one or more PtP links.

The computer system depicted in FIG. 12 is a schematic illustration of an embodiment of a computing system that may be utilized to implement various embodiments discussed herein. It will be appreciated that various components of the system depicted in FIG. 12 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Other variations are within the scope of the following claims.

The architectures presented herein are provided by way of example only, and are intended to be non-exclusive and non-limiting. Furthermore, the various parts disclosed are intended to be logical divisions only, and need not necessarily represent physically separate hardware and/or software components. Certain computing systems may provide memory elements in a single physical memory device, and in other cases, memory elements may be functionally distributed across many physical devices. In the case of virtual machine managers or hypervisors, all or part of a function may be provided in the form of software or firmware running over a virtualization layer to provide the disclosed logical function.

Note that with the examples provided herein, interaction may be described in terms of a single computing system. However, this has been done for purposes of clarity and example only. In certain cases, it may be easier to describe one or more of the functionalities of a given set of flows by only referencing a single computing system. Moreover, the system for deep learning and malware detection is readily scalable and can be implemented across a large number of components (e.g., multiple computing systems), as well as more complicated/sophisticated arrangements and configurations. Accordingly, the examples provided should not limit the scope or inhibit the broad teachings of the computing system as potentially applied to a myriad of other architectures.

As used herein, unless expressly stated to the contrary, use of the phrase 'at least one of' refers to any combination of the named elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and Y, but not Z; 5) at least one X and Z, but not Y; 6) at least one Y and Z, but not X; or 7) at least one X, at least one Y, and at least one Z.

Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

References in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment.

While this specification contains many specific implementation details, these should not be construed as limitations on the scope of any embodiments or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, the separation of various system components and modules in the embodiments described above should not be understood as requiring such separation in all embodiments. It should be understood that the described program components, modules, and systems can generally be integrated together in a single software product or packaged into multiple software products.

Thus, particular embodiments of the subject matter have been described.

Other embodiments are within the scope of this disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The following examples pertain to embodiments in accordance with this specification. It will be understood that one or more aspects of certain examples described below may be combined with or implemented in certain other examples, including examples not explicitly indicated.

Example 1 includes a processor comprising: data cache units storing encrypted data; and a microprocessor pipeline coupled to the data cache units. The microprocessor pipeline comprises circuitry to access and execute a sequence of cryptographic-based instructions based on the encrypted data. Execution of the sequence of cryptographic-based instructions comprises at least one of: decryption of the encrypted data based on a first pointer value; execution of a cryptographic-based instruction based on data obtained from decryption of the encrypted data; encryption of a result of execution of a cryptographic-based instruction, wherein the encryption is based on a second pointer value; and storage of encrypted data in the data cache units, wherein the encrypted data stored in the data cache units is based on an encrypted result of execution of a cryptographic-based instruction.

Example 2 includes the subject matter of Example 1, and optionally, wherein the circuitry is further to: generate, for each cryptographic-based instruction, at least one encryption-based microoperation and at least one non-encryption-based microoperation the cryptographic-based instruction; and schedule the at least one encryption-based microoperation and the at least one non-encryption-based microoperation for execution based on timings of the encryption-based microoperation.

Example 3 includes the subject matter of Example 2, and optionally, wherein the encryption-based microoperation is based on a block cipher, and the non-encryption-based microoperation is scheduled as dependent upon the encryption-based microoperation.

Example 4 includes the subject matter of Example 2, and optionally, wherein the encryption-based microoperation is based on a counter mode block cipher, and the non-encryption-based microoperation is scheduled to execute in parallel with encryption of a counter.

Example 5 includes the subject matter of Example 2, and optionally, wherein the encryption-based microoperation is one of an encryption operation and a decryption operation.

Example 6 includes the subject matter of Example 2, and optionally, wherein the non-encryption-based microoperation is one of a load operation and a store operation.

Example 7 includes the subject matter of any one of Examples 1-6, and optionally, wherein the circuitry is to decrypt the encrypted data by using the first pointer value as an input to a decryption function.

Example 8 includes the subject matter of Example 7, and optionally, wherein the circuitry to decrypt the encrypted data is in a load buffer of the processor.

Example 9 includes the subject matter of Example 7, and optionally, wherein the circuitry is to decrypt the encrypted data further by: generating a key stream based on the first pointer value and a counter value; and performing an XOR operation on the key stream and the encrypted data to yield the decrypted data.

Example 10 includes the subject matter of any one of Examples 1-6, and optionally, wherein the circuitry is to encrypt the result of the execution of the cryptographic-based instruction by using the second pointer value as an input to an encryption function.

Example 11 includes the subject matter of Example 10, and optionally, wherein the circuitry to encrypt the result of the execution of the cryptographic-based instruction is in a store buffer of the processor.

Example 12 includes the subject matter of any one of Examples 1-6, and optionally, wherein at least one of the first pointer value and the second pointer value is an effective address based on an encoded linear address that is at least partially encrypted, and the circuitry is further to: access the encoded linear address; decrypt an encrypted portion of the encoded linear address based on a key obtained from a register of the processor; and generate the effective address based on a result of the decryption of the encrypted portion of the encoded linear address.

Example 13 includes the subject matter of Example 12, and optionally, wherein the entirety of the encoded linear address is encrypted.

Example 14 includes the subject matter of Example 12, and optionally, wherein the circuitry to decrypt the encoded linear address is in an address generation unit of the processor.

Example 15 includes a method comprising: accessing a sequence of cryptographic-based instructions to execute on encrypted data stored in data cache units of a processor; and executing the sequence of cryptographic-based instructions by a core of the processor, wherein execution comprises one or more of: decryption of the encrypted data based on a first pointer value; execution of a cryptographic-based instruction based on data obtained from decryption of the encrypted data; encryption of a result of execution of a cryptographic-based instruction, wherein the encryption is based on a second pointer value; and storage of encrypted data in the data cache units, wherein the encrypted data stored in the data cache units is based on an encrypted result of execution of a cryptographic-based instruction.

Example 16 includes the subject matter of Example 15, and optionally, wherein executing the sequence of cryptographic-based instructions comprises: generating, for each cryptographic-based instruction, at least one encryption-based microoperation and at least one non-encryption-based microoperation the cryptographic-based instruction; scheduling the at least one encryption-based microoperation and the at least one non-encryption-based microoperation for execution based on timings of the encryption-based microoperation; and executing the scheduled microoperations.

Example 17 includes the subject matter of Example 16, and optionally, wherein the encryption-based microoperation is based on a block cipher, and the non-encryption-based microoperation is scheduled as dependent upon the encryption-based microoperation.

Example 18 includes the subject matter of Example 16, and optionally, wherein the encryption-based microoperation is based on a counter mode block cipher, and the non-encryption-based microoperation is scheduled to execute in parallel with encryption of a counter.

Example 19 includes the subject matter of Example 16, and optionally, wherein the encryption-based microoperation is one of an encryption operation and a decryption operation, and the non-encryption-based microoperation is one of a load operation and a store operation.

Example 20 includes the subject matter of Example 19, and optionally, wherein the encryption operation and decryption operation each utilize a pointer value as a tweak input.

Example 21 includes the subject matter of any one of Examples 16-20, and optionally, wherein the decryption is performed by circuitry coupled to or implemented in, a load buffer of the processor.

Example 22 includes the subject matter of any one of Examples 16-20, and optionally, wherein the encryption is performed by circuitry coupled to or implemented in, a store buffer of the processor.

Example 23 includes the subject matter of any one of Examples 16-20, and optionally, wherein decrypting the encrypted data comprises: generating a key stream based on the first pointer value and a counter value; and performing an XOR operation on the key stream and the encrypted data to yield the decrypted data.

Example 24 includes the subject matter of any one of Examples 16-20, and optionally, wherein at least one of the first pointer value and the second pointer value is an effective address based on an encoded linear address that is at least partially encrypted, and the method further comprises: accessing the encoded linear address; decrypting an encrypted portion of the encoded linear address based on a key obtained from a register of the processor; and generating the effective address based on a result of the decryption of the encrypted portion of the encoded linear address.

Example 25 includes the subject matter of Example 24, and optionally, wherein the entirety of the encoded linear address is encrypted.

Example 26 includes the subject matter of Example 24, and optionally, wherein the decryption of the encoded linear address is by an address generation unit of the processor Example 27 includes a system comprising: memory storing cryptographic-based instructions, and a processor coupled to the memory. The processor comprises: data cache units storing encrypted data; means for accessing the cryptographic-based instructions, the cryptographic instructions to execute based on the encrypted data; means for decrypting the encrypted data based on a first pointer value; means for executing the cryptographic-based instruction using the decrypted data; means for encrypting a result of the execution of the cryptographic-based instruction based on a second pointer value; and means for storing the encrypted result in the data cache units.

Example 28 includes the subject matter of Example 27, and optionally, wherein the means for decrypting the encrypted data comprises a load buffer of the processor.

Example 29 includes the subject matter of Example 27, and optionally, wherein the means for encrypting a result of the execution of the cryptographic-based instruction comprises a store buffer of the processor.

Example 30 includes the subject matter of any one of Examples 27-29, and optionally, wherein at least one of the first pointer value and the second pointer value is an effective address based on an encoded linear address that is at least partially encrypted, and the processor further comprises additional means for: accessing the encoded linear address; decrypting an encrypted portion of the encoded linear address based on a key obtained from a register of the processor; and generating the effective address based on a result of the decryption of the encrypted portion of the encoded linear address.

Example 31 includes the subject matter of Example 30, and optionally, wherein the additional means comprises an address generation unit of the processor.

Example 32 includes a processor core supporting the encryption and the decryption of pointers keys, and data in the core and where such encryption and decryption operations are performed by logic and circuitry which is part of the processor microarchitecture pipeline.

Example 33 includes the subject matter of Example 32, and optionally, wherein instructions that perform encrypted memory loads and stores are mapped into at least one block encryption µop and at least one regular load/store µop.

Example 34 includes the subject matter of Example 32, and optionally, wherein an in order or out-of-order execution scheduler schedules the execution of encryption, decryption and load/store µops and where load and store µops are considered as dependent on one of a block encryption and a block decryption µop.

Example 35 includes the subject matter of Example 34, and optionally, wherein the out-of-order execution scheduler may load and store µops can execute in parallel with the encryption of a counter.

Example 36 includes the subject matter of Example 32, and optionally, wherein decryption of data is tweaked by a pointer and the decryption takes place in the load buffer.

Example 37 includes the subject matter of Example 32, and optionally, wherein encryption of data is tweaked by a pointer and the encryption takes place in the store buffer.

Example 38 includes the subject matter of Example 32, and optionally, wherein decryption of a pointer takes place in the address generation unit.

Example 39 includes the subject matter of Example 32, and optionally, wherein decryption of a slice of a base takes place in the address generation unit.

Example 40 may include a device comprising logic, modules, circuitry, or other means to perform one or more elements of a method described in or related to any of the examples above or any other method or process described herein.

What is claimed is:

1. A processor comprising:
data cache units storing encrypted data; and
a microprocessor pipeline coupled to the data cache units, the microprocessor pipeline comprising circuitry to access and execute a sequence of cryptographic-based instructions based on the encrypted data, the microprocessor pipeline circuitry to:
decrypt the encrypted data, wherein the decryption is performed using a first linear address for the encrypted data as a tweak input to a decryption function;
execute a cryptographic-based instruction based on data obtained from decryption of the encrypted data;
encrypt of a result of execution of a cryptographic-based instruction, wherein the encryption is performed using a second linear address as a tweak input to an encryption function, the second linear address indicating a location in memory at which to store a result of the encryption; and
store encrypted data in the data cache units, wherein the encrypted data stored in the data cache units is based on an encrypted result of execution of a cryptographic-based instruction.

2. The processor of claim 1, wherein the circuitry is further to:
generate, for each cryptographic-based instruction, at least one encryption-based microoperation and at least one non-encryption-based microoperation; and
schedule the at least one encryption-based microoperation and the at least one non-encryption-based microoperation for execution based on timings of the encryption-based microoperation.

3. The processor of claim 2, wherein the encryption-based microoperation is based on a block cipher, and the non-encryption-based microoperation is scheduled as dependent upon the encryption-based microoperation.

4. The processor of claim 2, wherein the encryption-based microoperation is based on a counter mode block cipher, and the non-encryption-based microoperation is scheduled to execute in parallel with encryption of a counter.

5. The processor of claim 2, wherein the encryption-based microoperation is one of an encryption operation and a decryption operation.

6. The processor of claim 2, wherein the non-encryption-based microoperation is one of a load operation and a store operation.

7. The processor of claim 1, wherein the circuitry to decrypt the encrypted data is in a load buffer of the processor.

8. The processor of claim 1, wherein the circuitry is to decrypt the encrypted data further by:
generating a key stream based on the first linear address and a counter value; and
performing an XOR operation on the key stream and the encrypted data to yield the decrypted data.

9. The processor of claim 1, wherein the circuitry to encrypt the result of the execution of the cryptographic-based instruction is in a store buffer of the processor.

10. The processor of claim 1, wherein at least one of the first linear address and the second linear address is an effective address based on an encoded linear address that is at least partially encrypted, and the circuitry is further to:
access the encoded linear address;
decrypt an encrypted portion of the encoded linear address based on a key obtained from a register of the processor; and
generate the effective address based on a result of the decryption of the encrypted portion of the encoded linear address.

11. The processor of claim 10, wherein the entirety of the encoded linear address is encrypted.

12. The processor of claim 10, wherein the circuitry to decrypt the encoded linear address is in an address generation unit of the processor.

13. The processor of claim 1, wherein the circuitry is to perform the decryption is in a load buffer of the processor.

14. The processor of claim 1, wherein the circuitry is to perform the encryption is in a store buffer of the processor.

15. A method comprising:
accessing a sequence of cryptographic-based instructions to execute on encrypted data stored in data cache units of a processor; and
executing the sequence of cryptographic-based instructions by a core of the processor, wherein execution comprises one or more of:
decrypting the encrypted data using a first linear address for the encrypted data as a tweak input to a decryption function;
executing a cryptographic-based instruction based on data obtained from decryption of the encrypted data;
encrypting a result of execution of a cryptographic-based instruction, wherein the encryption is performed using a second linear address as a tweak input to an encryption function, the second linear address indicating a location in memory at which to store a result of the encryption; and
storing encrypted data in the data cache units, wherein the encrypted data stored in the data cache units is based on an encrypted result of execution of a cryptographic-based instruction.

16. The method of claim 15, wherein executing the sequence of cryptographic-based instructions comprises:
generating, for each cryptographic-based instruction, at least one encryption-based microoperation and at least one non-encryption-based microoperation;
scheduling the at least one encryption-based microoperation and the at least one non-encryption-based microoperation for execution based on timings of the encryption-based microoperation; and
executing the scheduled microoperations.

17. The method of claim 16, wherein the encryption-based microoperation is based on a block cipher, and the non-encryption-based microoperation is scheduled as dependent upon the encryption-based microoperation.

18. The method of claim 16, wherein the encryption-based microoperation is based on a counter mode block cipher, and the non-encryption-based microoperation is scheduled to execute in parallel with encryption of a counter.

19. The method of claim 16, wherein the encryption-based microoperation is one of an encryption operation and a decryption operation, and the non-encryption-based microoperation is one of a load operation and a store operation.

20. A system comprising:
memory storing cryptographic-based instructions; and
a processor coupled to the memory, the processor comprising:
data cache units storing encrypted data;
means for accessing the cryptographic-based instructions, the cryptographic instructions to execute based on the encrypted data;
means for decrypting the encrypted data using a first linear address for the encrypted data as a tweak input to a decryption function;
means for executing the cryptographic-based instruction using the decrypted data;
means for encrypting a result of the execution of the cryptographic-based instruction using a second linear address as a tweak input to an encryption function, the second linear address indicating a location in memory at which to store a result of the encryption; and
means for storing the encrypted result in the data cache units.

21. The system of claim 20, wherein the means for decrypting the encrypted data comprises a load buffer of the processor.

22. The system of claim 20, wherein the means for encrypting a result of the execution of the cryptographic-based instruction comprises a store buffer of the processor.

23. The system of claim 20, wherein at least one of the first linear address and the second linear address is an effective address based on an encoded linear address that is at least partially encrypted, and the processor further comprises additional means for:
accessing the encoded linear address;

decrypting an encrypted portion of the encoded linear address based on a key obtained from a register of the processor; and generating the effective address based on a result of the decryption of the encrypted portion of the encoded linear address.

24. The system of claim 23, wherein the additional means comprises an address generation unit of the processor.

\* \* \* \* \*